US009992136B2

(12) United States Patent
Takase et al.

(10) Patent No.: US 9,992,136 B2
(45) Date of Patent: Jun. 5, 2018

(54) NETWORK SYSTEM AND MANAGEMENT SERVER

(71) Applicant: Hitachi, Ltd., Tokyo (JP)

(72) Inventors: Masayuki Takase, Tokyo (JP); Taisuke Ueta, Tokyo (JP); Masanobu Kobayashi, Tokyo (JP); Ryousuke Nishino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 245 days.

(21) Appl. No.: 14/733,246

(22) Filed: Jun. 8, 2015

(65) Prior Publication Data

US 2016/0006675 A1 Jan. 7, 2016

(30) Foreign Application Priority Data

Jul. 1, 2014 (JP) ................... 2014-135512

(51) Int. Cl.
*G06F 15/173* (2006.01)
*H04L 12/935* (2013.01)
*H04L 12/24* (2006.01)

(52) U.S. Cl.
CPC ...... *H04L 49/3072* (2013.01); *H04L 41/0879* (2013.01)

(58) Field of Classification Search
CPC ................. H04L 49/3072; H04L 41/0879
USPC .................................. 709/223–224
See application file for complete search history.

(56) References Cited

U.S. PATENT DOCUMENTS

2003/0035430 A1\* 2/2003 Islam ................. H04L 41/0213
370/401
2003/0161319 A1\* 8/2003 Okagawa ................ H04L 45/00
370/395.4
2004/0170133 A1\* 9/2004 Oguchi ............... H04L 67/1002
370/299
2009/0016378 A1 1/2009 Takase et al.
2012/0140640 A1\* 6/2012 Lee ....................... H04L 43/026
370/242
2013/0042230 A1\* 2/2013 Little ....................... G06F 8/65
717/173
2014/0282611 A1\* 9/2014 Campbell ............ H04L 49/109
719/313

FOREIGN PATENT DOCUMENTS

JP 2009-21682 A 1/2009

OTHER PUBLICATIONS

Intel, NEC\*Virtualized EPC Innovation Powered by Multi Core Intel (R) Architecture Processors, pp. 1-12, Printed in USA MS/VC/ 0613 order No. 329181-001 US.

\* cited by examiner

*Primary Examiner* — Duyen Doan
(74) *Attorney, Agent, or Firm* — Mattingly & Malur, PC

(57) ABSTRACT

A communication device includes a plurality of packet processing modules in which a packet processing function is changeable with a program, and a management server holds program information of a plurality of different packet processing module circuits settable to the packet processing modules, selects the packet processing module circuit to be set to the packet processing module, of the plurality of different packet processing module circuits, and transmits the program information of the selected packet processing module circuit and information for identifying the packet processing module that is an object to be set, to the communication device that is an object to be set.

7 Claims, 26 Drawing Sheets

| DEVICE ID 101 | LINE CARD ID 102 | PACKET PROCESSING MODULE NUMBER 103 | PACKET PROCESSING MODULE GROUP ID 104 | PACKET PROCESSING MODULE TYPE 105 | RESERVED PACKET PROCESSING MODULE NUMBER 106 | BUSY PACKET PROCESSING MODULE NUMBER 107 |
|---|---|---|---|---|---|---|
| 100 | 1 | 20 | 1 | VLAN | 2 | 1 |
| | | | 2 | IPv4 | 1 | 1 |
| | | | 3 | VXLAN | 1 | 1 |
| | 2 | 20 | 1 | MPLS-TP | 10 | 8 |
| 110 | 1 | 20 | 1 | VLAN | 3 | 2 |
| | 2 | 20 | 1 | MPLS-TP | 20 | 15 |
| | 3 | 20 | 1 | MPLS-TP | 20 | 10 |

| DEVICE ID (111) | LINE CARD ID (112) | PACKET PROCESSING MODULE ID (113) | PACKET PROCESSING MODULE TYPE (114) | STATUS (115) |
|---|---|---|---|---|
| 100 | 1 | 1 | VLAN | ENABLED |
| | | 2 | VLAN | DISABLED |
| | | 3 | IPv4 | ENABLED |
| | | 4 | VXLAN | ENABLED |
| | | 5 | Empty | — |
| | | 20 | Empty | — |
| | 2 | 1 | MPLS-TP | ENABLED |
| | | 2 | MPLS-TP | ENABLED |
| | | 11 | Empty | — |
| | | 20 | Empty | — |
| 110 | 1 | 1 | VLAN | ENABLED |
| | | 2 | Empty | — |

| DEVICE CONNECTION INFORMATION | LINK BANDWIDTH (bit/s) | RESERVED BANDWIDTH (bit/s) | AVAILABLE BANDWIDTH (bit/s) |
|---|---|---|---|
| 101_01_01 − EXTERNAL DEVICE | | | |
| 101_01_02 − EXTERNAL DEVICE | | | |
| 100_02_01 − 101_02_01 | | | |
| 101_03_01 − 102_02_01 | | | |
| | | | |
| | | | |

| USER ID | PRIORITY | CONNECTING FEES | ROUTE ID | ROUTE INFORMATION | | | | GUARANTEED BANDWIDTH Bw0 (bit/s) | AVAILABLE PROTOCOL |
| --- | --- | --- | --- | --- | --- | --- | --- | --- | --- |
| | | | | DEVICE ID 136-1 | LINE CARD ID 137-1 | DEVICE ID 136-n | LINE CARD ID 137-n | | |
| 131 | 132 | 133 | 134 | 135 | | | | 138 | 139 |
| | | | | | | | | | |
| | | | | | | | | | |
| | | | | | | | | | |
| | | | | | | | | | |

| DEVICE ID | LINE CARD ID | PACKET PROCESSING MODULE TYPE | TOTAL BANDWIDTH (bit/s) | CURRENT TIME USE BANDWIDTH (bit/s) | TIME ZONE A USE BANDWIDTH (bit/s) | TIME ZONE B USE BANDWIDTH (bit/s) | RESOURCE SHORTAGE NOTIFICATION THRESHOLD (%) | RESOURCE EXCESS NOTIFICATION THRESHOLD (%) |
|---|---|---|---|---|---|---|---|---|
| 141 | 142 | 143 | 144 | 145 | 146 | 147 | 148 | 149 |
| 100 | 1 | VLAN | | | | | | |
| | | IPv4 | | | | | | |
| | | VXLAN | | | | | | |
| | 2 | MPLS-TP | | | | | | |
| 110 | 1 | VLAN | | | | | | |
| | 2 | MPLS-TP | | | | | | |
| | 3 | MPLS-TP | | | | | | |
| | | | | | | | | |
| | | | | | | | | |

| EVENT | ACTION |
|---|---|
| HIGH-PRIORITY QUEUE PACKET DISCARD | PACKET PROCESSING MODULE CIRCUIT AUTOMATIC ADDITION |
| HIGH-PRIORITY QUEUE LOAD INCREASE | PACKET PROCESSING MODULE CIRCUIT ADDITION RECOMMENDATION SCREEN DISPLAY |
| HIGH-PRIORITY QUEUE LOAD DECREASE | PACKET PROCESSING MODULE CIRCUIT AUTOMATIC REDUCTION |
| LOW-PRIORITY QUEUE PACKET DISCARD | PACKET PROCESSING MODULE CIRCUIT ADDITION RECOMMENDATION SCREEN DISPLAY |
| LOW-PRIORITY QUEUE LOAD INCREASE | NO PROCESSING |
| LOW-PRIORITY QUEUE LOAD DECREASE | PACKET PROCESSING MODULE CIRCUIT DISABLEMENT |
| UNSUPPORTED PROTOCOL DETECTION | PACKET PROCESSING MODULE CIRCUIT ADDITION RECOMMENDATION SCREEN DISPLAY |
| | |

| PACKET PROCESSING MODULE TYPE | FILE NAME |
|---|---|
| VLAN PROCESSING | VLAN |
| IPv4 PROCESSING | IPv4 |
|  |  |
|  |  |
|  |  |
|  |  |
|  |  |
|  |  |
|  |  |

161 — left column, 162 — right column

| DISTRIBUTION IDENTIFICATION ID | PACKET PROCESSING MODULE GROUP ID |
|---|---|
|  |  |
|  |  |
|  |  |
|  |  |
|  |  |

201 — left column, 202 — right column

| PACKET PROCESSING MODULE GROUP ID 211 | PACKET PROCESSING MODULE GROUP TOTAL BANDWIDTH (bit/s) 212 | RESERVED PACKET PROCESSING MODULE ID 213 | BUSY PACKET PROCESSING MODULE ID 214 |
|---|---|---|---|
| | | | |
| | | | |
| | | | |
| | | | |

NETWORK SYSTEM AND MANAGEMENT SERVER

CROSS-REFERENCE TO RELATED APPLICATIONS

This application claims the priority of Japanese Patent Application No. 2014-135512, filed on Jul. 1, 2014, which is incorporated herein by reference in its entirety.

BACKGROUND OF THE INVENTION

1. Field of the Invention

The present invention relates to a network system, and is especially suitable to change a function and performance of a communication device that configures a network according to a function and performance of a peripheral device connected to the network.

2. Description of the Related Art

The advent of new IT technologies such as software defined networking (SDN) and network function virtualization (NFV) accelerates a decrease in a generation cycle or long tail of new communication services.

As illustrated in FIG. 1, conventional wide area networks (WANs) of communication operators are often created exclusively for communication services provided in the networks. For example, FIG. 1 is configured from three networks including a mobile accommodation network 3, a wide area Ethernet service network 6, and an IP VPN service network 10. The mobile accommodation network 3 is built by an Ethernet (registered trademark) communication device 1-$n$ for accommodating a mobile service. The wide area Ethernet service network 6 is built by a provider backbone bridge (PBB) communication device 4-$n$ in order to provide a Layer 2 connection service among remote locations for companies. The IP VPN service network 10 is built by an IP/multi protocol label switching (MPLS) communication device 8-$n$ in order to provide an IP connection service among remote locations for companies, like the wide area Ethernet service network 6. As described above, the communication operators often build the exclusive networks for the respective communication services in order to accommodate the respective communication services.

Behind this background, it has been better to build the exclusive networks for the respective communication services and to provide the communication services because high quality and high reliability are required for the WANs to reliably transfer data packet with a small delay time. Further, there are a small number of types of the conventional communication services and these services are provided on the assumption that the same communication services are provided for a long period of time.

As supplemental explanation, the Ethernet communication device 1-$n$, the PBB communication device 4-$n$, and the IP/MPLS communication device 8-$n$ that configure these networks require a function to determine which route in the WAN is good to use to transfer a received data packet, and transfer the data packet in the WAN using the determined route, after analyzing an identifier (MAC or VLAN in a case of a service that identifies a destination with Ethernet (registered trademark), an IP address in a case of a service that identifies the destination with an IP, or the like) that identifies the destination or a user of the data packet received from an outside of the network.

Meanwhile, JP-2009-021682-A discloses a technology for accommodating a plurality of communication services in a single WAN. Intel "NEC*Virtualized EPC Innovation Powered by Multi Core Intel® Architecture Processors" [online] 2013 (Heisei 25) [searched on Dec. 16, 2013 (Heisei 25), the Internet <URL: http://networkbuilders.intel.com/docs/communications_nec_vi rtualized_epc_paper.pdf> discloses a technology that realizes processing function of communication services on a general purpose server by connecting the general purpose server outside the communication devices that build the WAN, and reinforces the processing function of the general purpose server with setting from a management system called SDN controller.

SUMMARY OF THE INVENTION

However, due to progress of the decrease in a generation cycle or the long tail of the new communication services with the advent of the SDN and the NFV as described above, an investment cost of the communication operators is increased if the exclusive networks are built for the respective communication services like the conventional technologies. Therefore, the communication operators face the task of suppression of the investment cost while providing networks that respond to the decrease in a generation cycle or the long tail of the new communication services.

In the technology disclosed in JP-2009-021682-A, to accommodate the new communication services in the communication devices that build the WAN, it is necessary to add line cards exclusive for the respective communication services to the communication devices that build the WAN. Therefore, the communication operators have an investment risk of necessity of purchasing the line cards having packet processing performance or a packet processing function, which is more than necessary and sufficient, at the introduction of the new communication services. In addition, there is a problem for the communication operators that the existing line cards cannot be diverted when the communication services end.

Further, although Intel "NEC*Virtualized EPC Innovation Powered by Multi Core Intel® Architecture Processors" [online] 2013 (Heisei 25) [searched on Dec. 16, 2013 (Heisei 25), the Internet <URL: http://networkbuilders.intel.com/docs/communicationsnecvi rtualized_epcpaper.pdf> discloses the reinforcement of the function of the general purpose server with the setting from the management system called SDN Controller, a scheme to analyze a use status of the network and to reinforce or delete the processing function of the general purpose server, or a scheme to add a new processing function to the general purpose server is not disclosed. Therefore, for example, there is a problem of occurrence of a loss of data packets when a maintenance person misses demand forecasting of the communication services.

Therefore, both documents have not realized network system for the communication operators, which suppresses the investment cost while providing networks with high quality and high reliability that respond to the decrease in a generation cycle or the long tail of the new communication services.

In view of the problems of the conventional technologies, the first objective of the present invention is to provide a network system that enables the communication operator to build a network with a necessary minimum investment cost at the introduction of a new communication service.

The second objective of the present invention is to provide a network system that enables a new communication service to be accommodated in a network without changing hardware of communication devices that use a communication service.

The third objective of the present invention is to decrease in a network maintenance cost while suppressing occurrence of a loss of data packets.

A communication device includes a plurality of packet processing modules in which a packet processing function is changeable with a program, and a management server holds program information of a plurality of different packet processing module circuits settable to the packet processing modules, selects the packet processing module circuit to be set to the packet processing module, of the plurality of different packet processing module circuits, and transmits the program information of the selected packet processing module circuit and information for identifying the packet processing module that is an object to be set, to the communication device that is an object to be set.

According to the network system of the present invention, a network building cost and a maintenance cost can be suppressed while a network with high quality and high reliability that respond to the decrease in a generation cycle or the long tail of a new communication service can be provided.

BRIEF DESCRIPTION OF THE DRAWINGS

FIG. 6 is an example of a packet processing module resource management database;

FIG. 7 is an example of a packet processing module function management database;

FIG. 10 is an example of a user management database;

FIG. 11 is an example of a packet processing module status database;

FIG. 12 is an example of an action database;

FIG. 13 is an example of a packet processing module circuit database;

FIG. 14 is an example of a packet distribution table;

FIG. 15 is an example of a packet processing module management table;

DESCRIPTION OF THE PREFERRED EMBODIMENTS

First Embodiment

Hereinafter, an embodiment of the present invention will be described in detail with reference to the drawings. In the embodiment of the present invention, a case of using a multi protocol label switching-transport profile (MPLS-TP), as a communication protocol of a wide area network (WAN) will be exemplarily described. However, even a network using a communication protocol other than this example can obtain a similar effect by using the present invention.

[Network System]

Figure 1:
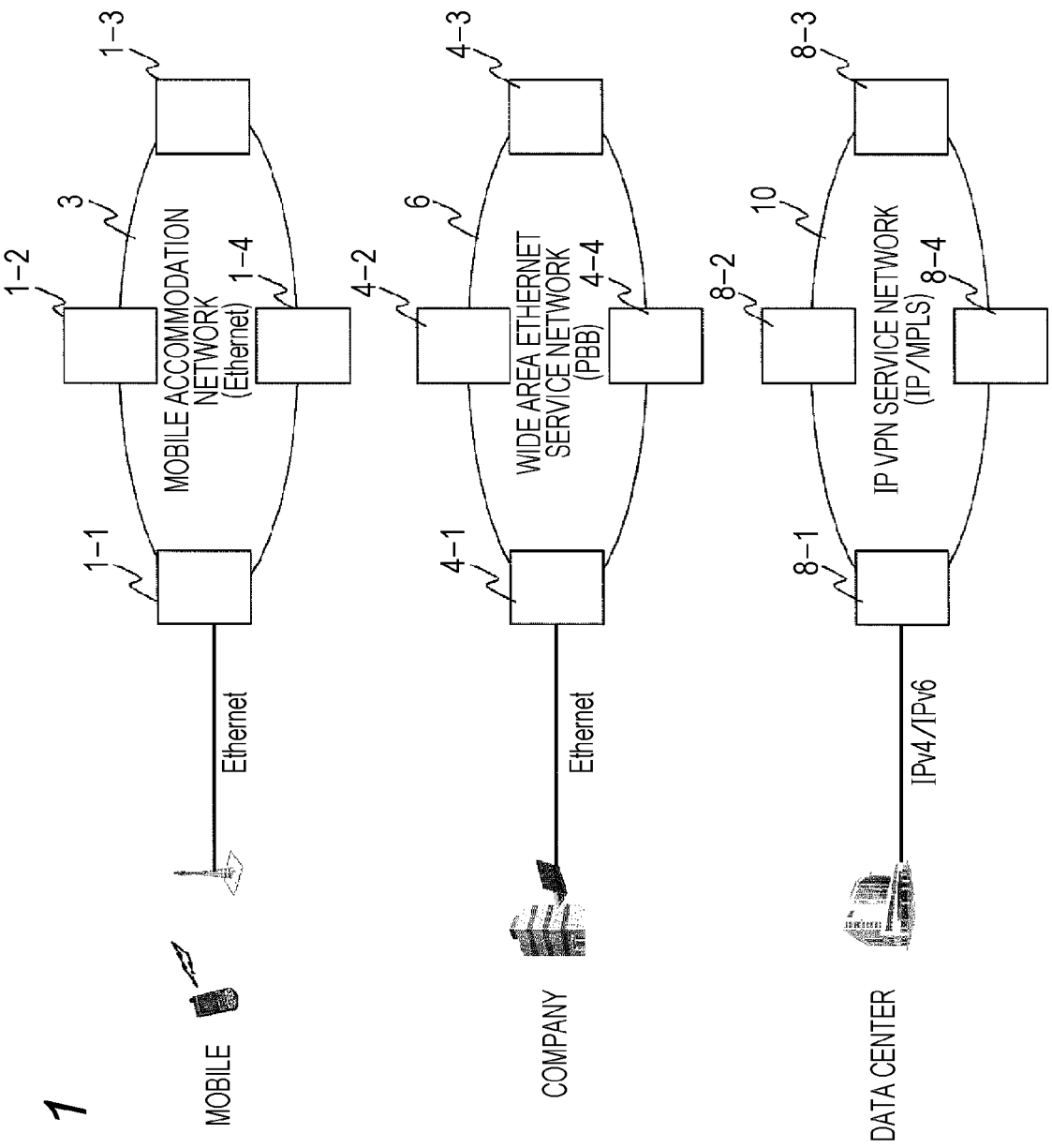
FIG. 1 is an example of a conventional communication carrier network.
Figure 2:
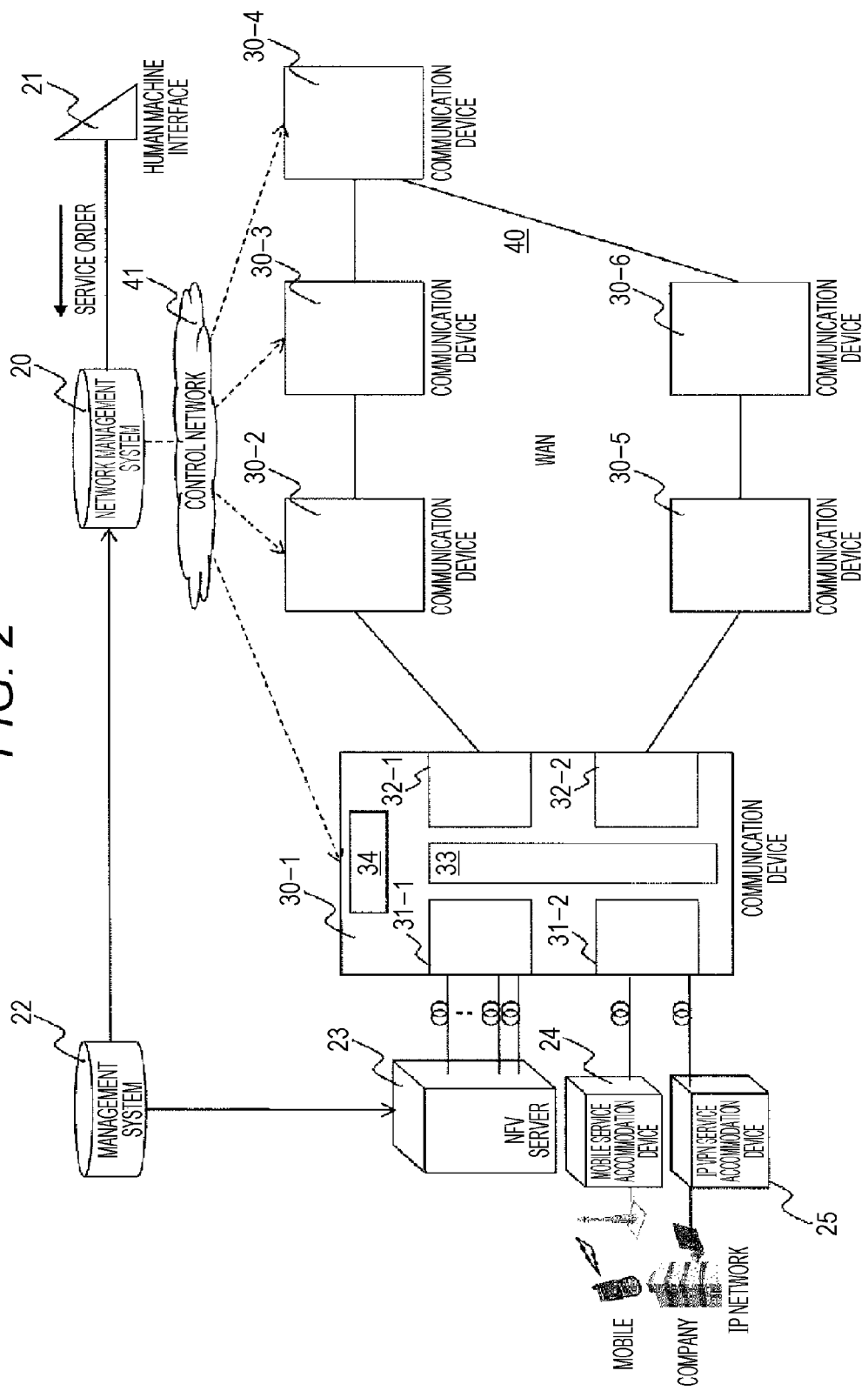
FIG. 2 is an example of a communication device network system of the present invention.

FIG. 2 illustrates an example of a network of the present invention.

A network system of the present invention is a system for accommodating various communication services in a single WAN 40, and is configured from a plurality of communication devices 30-$n$ that configures the WAN 40, a control network 41 that controls the communication devices 30-$n$, a network management system (hereinafter, "NMS") 20 that controls the communication devices 30-$n$ through the control network 41, and a human machine interface 21 with which a communication operator performs setting and status confirmation of the WAN 40.

[Configuration of NMS]

Figure 3:
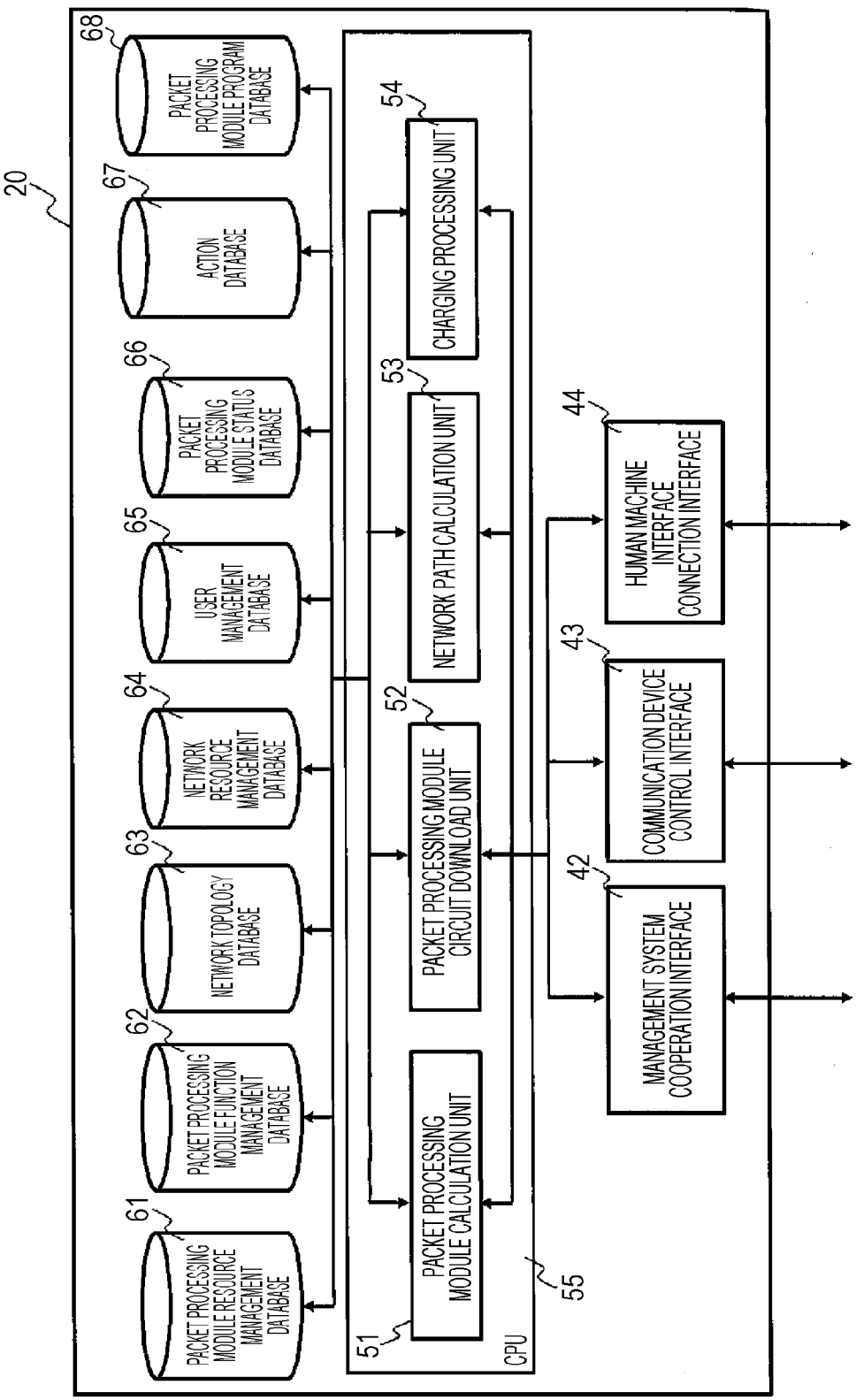
FIG. 3 is an example of a network management system.

FIG. 3 illustrates a configuration example of the NMS 20 used in the present invention.

The NMS 20 collects, from the communication devices 30-$n$, a flow-in amount of packets to the communication devices 30-$n$, existence or non-existence of discard of the packets in the communication devices 30-$n$, failure information of the communication devices 30-$n$, and the like, analyzes the collected information, and notifies the analyzed information to the human machine interface 21. Further, the NMS 20 executes control of a packet processing function and packet processing performance of the communication devices 30-$n$ according to an instruction from the human machine interface 21. Further, the NMS 20 receives a new communication service connection request or an increase/decrease request of a communication bandwidth from the management system 22 of a peripheral device, analyzes contents of the received request, notifies, to the human machine interface 21, the analyzed information, and controls the processing function and the processing performance of the communication devices 30-$n$ according to the instruction from the human machine interface. Further, the NMS 20 can execute control of the packet processing function and the packet processing performance of the communication devices 30-$n$ without manpower, based on the analysis result of the information collected from the communication devices 30-$n$, and can control the communication devices 30-$n$ without manpower, based on the analysis result of the various requests from the management system 22 of a peripheral device.

The NMS 20 flexibly changes and adds the packet processing function of the communication devices 30-$n$, whereby optimization of an investment cost of a communication operator, easy replacement of accommodation of the communication services, and a decrease in an operation load are realized.

The NMS 20 is configured from a packet processing module resource management database 61, a packet processing module function management database 62, a network topology database 63, a network resource management database 64, a user management database 65, a packet processing module status database 66, an action database 67, a packet processing module circuit database 68, a CPU 55, a management system cooperation interface 42 for communicating with the management system 22 of a peripheral device, a communication device control interface 43 for communicating with the communication devices 30-$n$, and a human machine interface connection interface 44 for communicating with the human machine interface 21. Further, the NMS 20 includes a memory (not illustrated).

The CPU 55 is an arithmetic device that implements functions of the NMS 20 by executing a program and the like stored in the memory. The CPU 55 may be any processor other than the CPU as long as the processor is an arithmetic device, and may be configured from one or a plurality of the processors. The CPU 55 may implement functions of: a packet processing module calculation unit 51 that calculates the packet processing function set to the communication devices 30-$n$ from information of each database; a packet processing module circuit download unit 52 that increases/decreases the packet processing function of the communication device 30-$n$ according to contents determined in the packet processing module calculation unit 51; a network path calculation unit 53 that calculates a communication route in the WAN 40; and a charging processing unit 54 that calculates an amount of money presented to the human machine interface 21 using one or more of the packet processing module resource management database 61, the packet processing module function management database 62, the network topology database 63, the network resource management database 64, the user management database 65, the packet processing module status database 66, the action database 67, and the packet processing module circuit database 68, by executing the program and the like.

The packet processing module calculation unit 51, the packet processing module circuit download unit 52, the network path calculation unit 53, and the charging processing unit 54 may be implemented with a single program, or may be implemented with a plurality of programs, respectively. Further, the CPU 55 may include one or a plurality of physical devices that implements the packet processing module calculation unit 51, the packet processing module circuit download unit 52, the network path calculation unit 53, and the charging processing unit 54. The packet processing module resource management database 61, the packet processing module function management database 62, the network topology database 63, the network resource management database 64, the user management database 65, the packet processing module status database 66, the action database 67, and the packet processing module circuit database 68 are connected with the CPU 55 through database access paths.

The charging processing unit 54 may include its function in a server or the like different from the network management system connected to the control network 41. In this case, databases necessary for charging processing, of the packet processing module resource management database 61, the packet processing module function management database 62, the network topology database 63, the network resource management database 64, the user management database 65, the packet processing module status database 66, the action database 67, and the packet processing module circuit database 68, are included in the server.

Detailed contents of each database will be described with reference to FIGS. 6 to 13.

FIG. 6 is an example of the packet processing module resource management database 61 included in the NMS 20. The packet processing module resource management database 61 is a database that holds the number of line cards included in each communication device 30-$n$, the number of packet processing modules mounted on the line cards, and use statuses of the packet processing modules.

The packet processing module resource management database 61 is configured from a device ID (identification) 101 that identifies the communication device 30-$n$, a line card ID 102 that identifies the line card mounted on the communication device 30-$n$, a packet processing module number 103 that indicates the number of packet processing modules mounted on the line card, a packet processing module group ID 104 that serves as a management ID when the same processing circuit is installed on the packet processing modules, a packet processing module type 105 that holds a type of the processing circuit installed on the packet processing modules for each packet processing module group ID 104, a reserved packet processing module number 106 that holds the number of the packet processing modules to which a packet processing module circuit belonging to the packet processing module group is installed, and a busy packet processing module number 107 that holds the number of packet processing modules with an enabled packet processing module circuit that is currently installed, of the packet processing modules belonging to the same packet processing module group.

FIG. 7 is an example of the packet processing module function management database 62 held in the NMS 20. The packet processing module function management database 62 is a database that manages the processing function installed in each packet processing module of the line card of the communication device 30-$n$.

The packet processing module function management database 62 is configured from a device ID 111 that identifies the communication device 30-$n$, a line card ID 112 that identifies the line card mounted on the communication device 30-$n$, a packet processing module ID 113 that identifies the packet processing module, packet processing module type 114 that hold circuit information installed in the packet processing, and a status 115 that holds a use status of the packet processing modules. When the circuit information is not installed in the packet processing module, the packet processing module type 114 becomes "empty". Further, "enablement" is held in the status 115 when the packet processing module circuit is enabled in the packet processing module, and "disablement" is held in the status 115 when the packet processing module circuit is disabled.

Figures 8, 9:
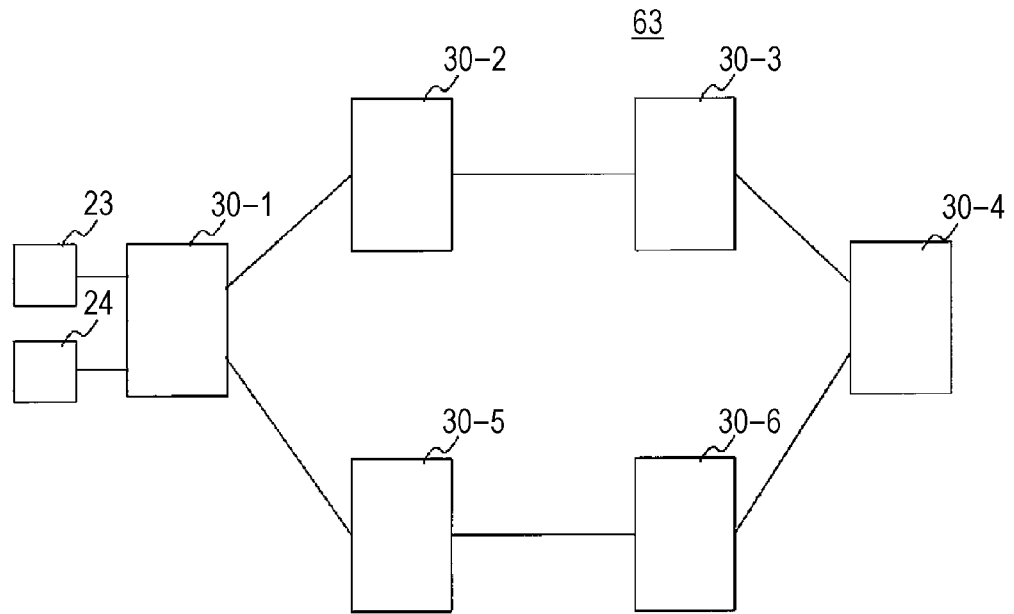
FIG. 8 is an example of a network topology database.
FIG. 9 is an example of a network resource management database.

FIG. 8 is an example of the network topology database 63 that is held in the NMS 20, and indicates connection relationship of the communication devices 30-n. In the network topology database 63, the connection relationship among the communication devices 30-n, and peripheral devices connected to the respective communication devices 30-n are managed. How the network is physically configured is known with the network topology database 63.

FIG. 9 is an example of the network resource management database 64 held in the NMS 20. The network resource management database 64 is configured from a device connection information 121 that indicates which devices of the communication devices 30-n and the peripheral devices managed in the network topology database are connected, a link bandwidth 122 that holds a connection link bandwidth between the communication devices 30-n or between the communication device 30-n and the peripheral device, a reserved bandwidth 123 that holds an available link speed of the link bandwidth 122, and a total bandwidth 124 that holds a bandwidth of the link bandwidth 122 except the reserved bandwidth 123.

FIG. 10 is an example of the user management database 65 included in the NMS 20. The user management database 65 is a database that holds contract contents of a user who uses the WAN 40, and a transfer route of user data in the WAN.

The user management database 65 is configured from a user ID 131 that identifies the user who uses the WAN 40, priority 132 that indicates a priority order of traffics in the WAN 40, the traffics being sent/received by the user, connecting fees 133 used for charging and the like of the user, a route ID 134 that identifies a route through which the user data is sent/received in the WAN, route information 135 configured from the communication device 30-n on the transfer route of the user data, a device ID 136-n that indicates the line card, and a line card ID 137-n, a guaranteed bandwidth 138 that holds a guaranteed bandwidth of the user, and an available protocol 139 that holds an available protocol of the user. The available protocol 139 is a protocol used for identifying the user and its destination, on a line card 31-n of the communication device 30-n of an edge that accommodates the user. For example, in a case where the available protocol 139 is IPv4, on the line card 31-n of the communication device 30-n of an edge that accommodates the user, the user and its destination can be identified by reference to a transmission source IP address or a destination IP address of IPv4.

FIG. 11 is an example of the packet processing module status database 66 held in the NMS 20. The packet processing module status database 66 is a database that holds a packet processing module use status history for each packet processing module type mounted on the line card of each communication device 30-n. The NMS 20 can manage a current use status of the packet processing modules and the use status of each time zone, and can increase/decrease the number of packet processing modules for each time zone, by holding the packet processing module status database 66. Further, the NMS 20 can notify the operator with addition/reduction of the packet processing module according to the use status of the packet processing module, by causing the packet processing module status database 66 to hold a resource shortage notification threshold and a resource excess notification threshold.

The packet processing module status database 66 is configured from a device ID 141 that identifies the communication device 30-n, a line card ID 142 that identifies the line card 31-n, a packet processing module type 143 that holds the packet processing module type installed in the packet processing module on the line card, a total bandwidth 144 that indicates a bandwidth that can perform processing in the packet processing module, a current time use bandwidth 145 that holds an amount of traffic that currently flows in to the packet processing module, time zone X use bandwidths 146 and 147 that hold total bandwidths of each packet processing module in respective time zones that are obtained by dividing one day into a plurality of time zones (FIG. 11 illustrates an example in which one day is divided into two time zones, and a time zone A use bandwidth 146 and a time zone B use bandwidth 147 are held), a resource shortage notification threshold 148 that serves as a threshold to be notified to the operator as resource shortage when a ratio of the current time use bandwidth 145 to the total bandwidth 144 is high, and a resource excess notification threshold 149 that serves as a threshold to be notified to the operator as resource excess when the ratio of the current time use bandwidth 145 to the total bandwidth 144 is low.

While in FIG. 11, an example in which one day is divided into two time zones, and the time zone A use bandwidth 146 and the time zone B use bandwidth 147 are managed has been described, a unit of a longer period of time than one day, such as one week or one month, may be divided into a plurality of time zones, and a plurality of time zone X use bandwidths may be held. At this time, the NMS 20 further holds a database for holding a past use bandwidth.

FIG. 12 is an example of the action database 67 held in the NMS 20. Examples of "event" are packet discard in the communication device 30-n, increase/decrease of a packet processing load in the communication device 30-n, data packet discard in the communication device 30-n, and various requests occurring in a peripheral management system. The action database 67 is a database that holds processing contents of when the event such as the packet discard in the communication device 30-n, the increase/decrease in a packet processing load in the communication device 30-n, the data packet discard in the communication device 30-n, or the like, which is notified from the communication device 30-n, is received, and processing contents of when the event such as the request from the peripheral management system, or the like is received. The NMS 20 can install the packet processing module necessary for the communication device 30-n without manpower at the time of occurrence of the event, can uninstall an unnecessary packet processing module, and can notify the human machine interface 21 of recommendation of addition/deletion of the packet processing module, by including the action database 67.

The action database 67 is configured from event 151 that hold an event type received from the communication device 30-n or the peripheral management system, and an action 152 that holds processing contents executed by the NMS 20 at the time of occurrence of the event. Examples of types of the action include packet processing module circuit automatic addition, packet processing module circuit addition recommendation screen display, packet processing module circuit automatic reduction, packet processing module circuit disable, and no processing.

The event 151 and the action 152 are set by the network operator. For example, the action of when the communication device 30-n detects detection of packet discard in a high-priority queue is set to the "packet processing module circuit automatic addition" so that the packet processing module is added without an instruction from the network operator when the discard of a packet occurs in the high-priority queue. Further, the action corresponding to a high-priority queue load increase event, a low-priority queue packet discard event, and an unsupported protocol detection event may be set to the "packet processing module circuit addition recommendation screen display" so that the packet processing module circuit is added when a packet processing module circuit addition recommendation screen is displayed in the human machine interface 21, and an instruction is given from the network operator when a load of the high-priority queue is increased to a predetermined threshold or more, when discard of a packet occurs in a low-priority queue, or when the unsupported protocol detection event is notified from the communication device 30-*n*. The action corresponding to a high-priority queue load decrease event is set to the "packet processing module circuit automatic reduction" so that the packet processing module circuit is deleted without an instruction from the network operator when the load is decreased in the high-priority queue. The action corresponding to a low-priority queue load decrease event is set to the "packet processing module circuit automatic reduction" so that the packet processing module circuit is disabled without an instruction from the network operator when a load is decreased in the low-priority queue. Further, the action corresponding to a low-priority queue load increase event is set to the "no processing" so that change of the setting of the packet processing module is not performed when the load is increased to a predetermined threshold or more in the low-priority queue of the communication device 30-*n*.

FIG. 13 is an example of the packet processing module circuit database 68 included in the NMS 20. The packet processing module circuit database 68 holds a circuit file of the packet processing module to be installed to the communication device 30-*n*. The packet processing module circuit database 68 is configured from a packet processing module type 161 and a file name 162 of a program.

[Configuration of Communication Device]

Figure 4:
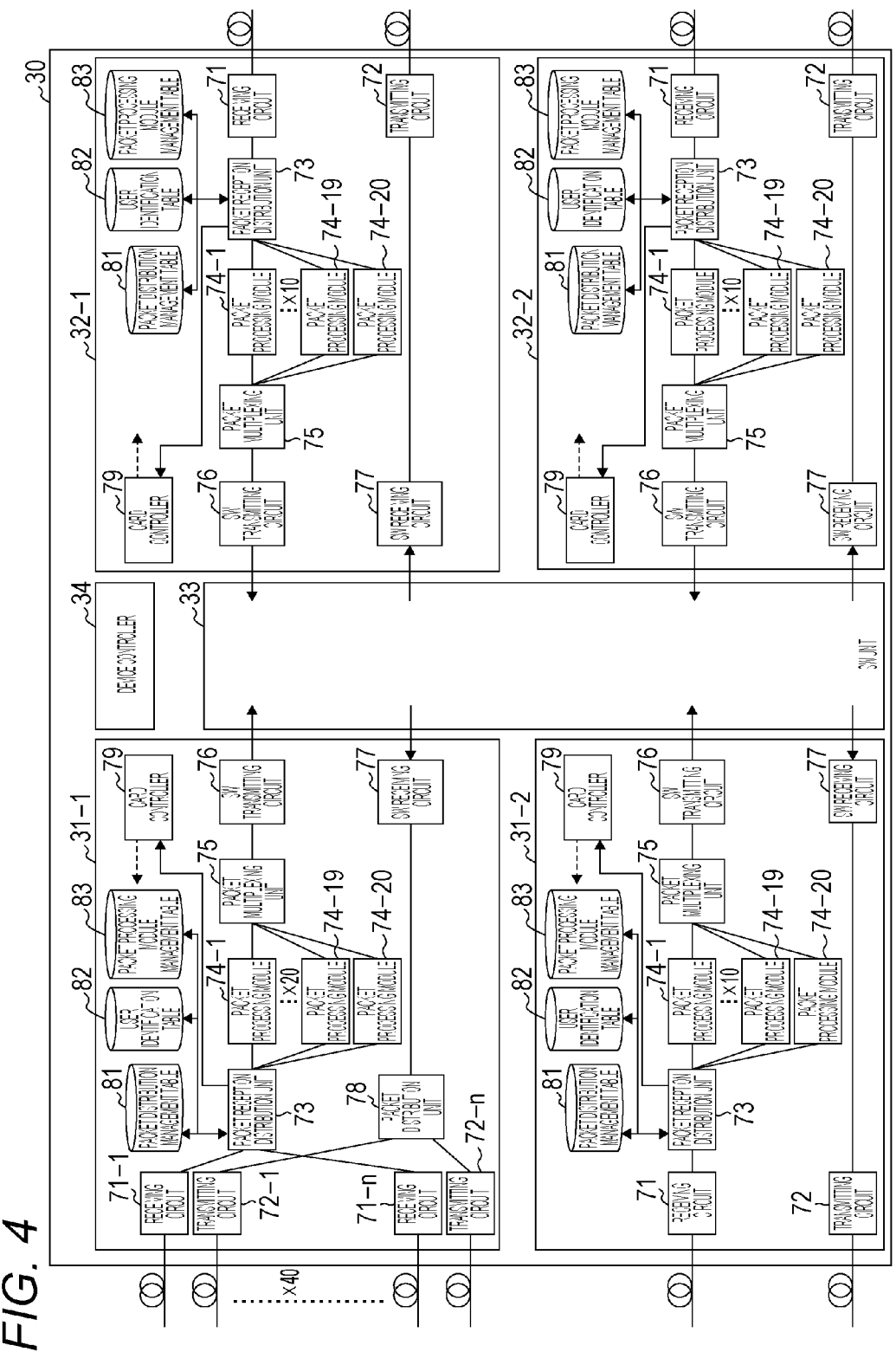
FIG. 4 is a configuration example of a communication device.

FIG. 4 illustrates a configuration example of the communication device 30 used in the present invention.

The communication device 30 holds a function to change a circuit to be operated on a packet processing module 74-*n* according to an instruction of the NMS 20, a function to notify the NMS 20 of count information of a data amount processing in the packet processing module 74-*n*, a function to notify the NMS 20 of the event occurring on the line card, and the like. Further, the communication device 30 holds a function to transfer the data packet to a predetermined route after identifying user information and destination information from the data packet when having received the data packet.

The communication device 30-*n* is configured from a user network interface (UNI) line card 31-*n* that accommodates various communication services, a network network interface (NNI) line card 32-*n* used for connection between the communication devices 30-*n*, and configuring the WAN 40, a switch card 32 used for transfer of the data packet between various line cards, and a device controller 34 that performs communication of control information between the communication device 30-1 and the NMS 20, and performs control of and monitors a state of the various line cards and the switch card 32.

The UNI line card 31-*n* enables various communication services to be accommodated in a single communication device 30-*n* by being connected with a the network function virtualization (NFV) server 23 that can be used as various communication devices, a mobile service accommodation device 24 that accommodates a mobile service, an IP VPN service accommodation device 25 that accommodates a virtual private network (VPN) service for companies, and the like. Although details will be described below, a plurality of packet processing modules that performs destination analysis and protocol conversion of the received data packet is mounted on the UNI line card 31-*n* and the NNI line card 32-*n*. When having received the data packet, the communication device 30-*n* performs the destination analysis and the protocol conversion of the packed in the packet processing module, and transfers the data packet to the next communication device 30-*n*. Note that the functions executed on the packet processing module can be changed by the communication device 30-*n* during an operation. Hereinafter, description of "line card" refers to the UNI line card 31-*n* and the NNI line card 32-*n*.

The device controller 34 is connected with the NMS 20 through the control network 41. The device controller 34 performs communication of control information with the NMS 20. Further, the device controller 34 executes information collection from the UNI line card 31, the NNI line card 32, and an SW card 33, parameter setting with respect to the UNI line card 31, the NNI line card 32, and the SW card 33 according to an instruction from the NMS 20, and installation/uninstallation processing of the packet processing module circuit to/from the packet processing modules of the UNI line card 32 and the NNI line card.

The switch card 33 is connected with the line cards (the UNI line card 31-*n* and the NNI line card 32-*n*), and has a function to transfer the data packet received from each line card to another line card.

Next, details of the UNI line card 31 and the NNI line card 32 will be described. Regarding the UNI line card 31 and the NNI line card 32, the line card that accommodates the communication service is named UNI line card, and the line card that connects the communication devices is named NNI line card, for convenience of description. However, functions that configure the respective line cards are the same. Here, a configuration of the UNI line card 31 will be described as an example.

The UNI line card 31 is configured from one or more receiving circuits 71, one or more transmitting circuits 72, a packet reception distribution unit 73, one or more packet processing modules 74, a packet multiplexing unit 75, an SW transmitting circuit 76, an SW receiving circuit 77, a packet distribution unit 78, a card controller 79, and a transmission/reception physical port (not illustrated).

The receiving circuit 71 receives the data packets from an adjacent communication device 30-*n* and a user device through the physical port, and adjusts the received data packets to a format processed inside the communication device 30. The number of the receiving circuits 71 mounted on the line card is changed according to the number of physical communication ports included in the UNI line card 31. For example, when data packet processing performance of one line card is 100 Gbit/s, and a plurality of ports of 10 Gbit/s is included, 10 receiving circuits are included.

The transmitting circuit 72 is a circuit that transmits the data packets to the adjacent communication device 30-*n* and the user device through the physical port. When transmitting the data packets to an outside of the WAN 20, the transmitting circuit 72 converts the data packets from the format inside the device into a format outside the device, and transmits the data packets. Further, similarly to the receiving circuit 71, the number of the transmitting circuits 72 mounted on the line card is changed according to the number of the physical ports included in the UNI line card 31. For example, when the data packet processing performance of one line card is 100 Gbit/s, and a plurality of ports of 10 Gbit/s is included, 10 transmitting circuits are included.

Next, details of the packet reception distribution unit 73 will be described with reference to FIGS. 5, 14, and 15.

Figure 5:
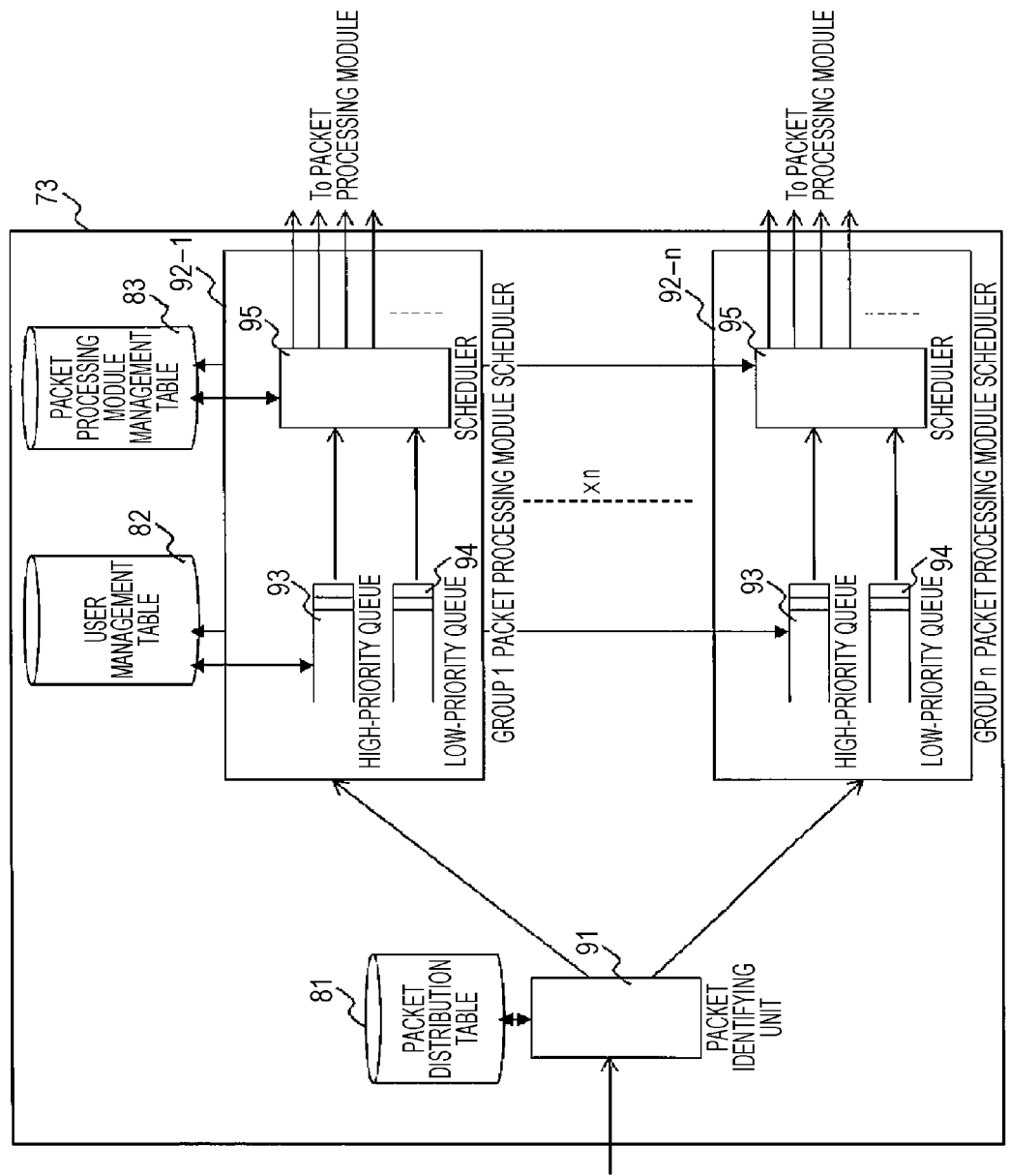
FIG. 5 is a configuration of a packet reception distribution unit.

FIG. 5 illustrates an example of a functional block diagram, of the packet reception distribution unit 73.

The packet reception distribution unit 73 is configured from a packet identifying unit 91 including a packet distribution table 81, and a group n packet processing module scheduler 92-n including a user priority management table 82 and a packet processing module management table 83.

Further, the group n packet processing module scheduler 92-n is configured from a class queue that temporarily stores packets having a plurality of priorities, for each priority, and a scheduler 95. The scheduler 95 determines the packet processing module that executes processing of the data packet, based on the packet processing module management table 83, and transfers the packet from the class queue to the packet processing module according to the priority order. Here, the class queue is exemplarily illustrated as two classes of a high-priority queue 93 and a low-priority queue 94. However, the number of the class queues may be two or more, or may be one when no priority is given to the received packet.

FIG. 14 illustrates a configuration example of the packet distribution table 81. The packet distribution table 81 is configured from a distribution identification ID 201 of data packet that serves as a search key of the packet distribution table 81, and a packet processing module group ID 202. When the communication device 30 determines the processing of the packet from the physical port from which the packet is received, a physical port ID is stored in the distribution identification ID 201. Further, a packet processing module group ID of the packet processing module group that performs the processing of the data packet received from the physical port is stored in the packet processing module group ID 202.

Figure 16:
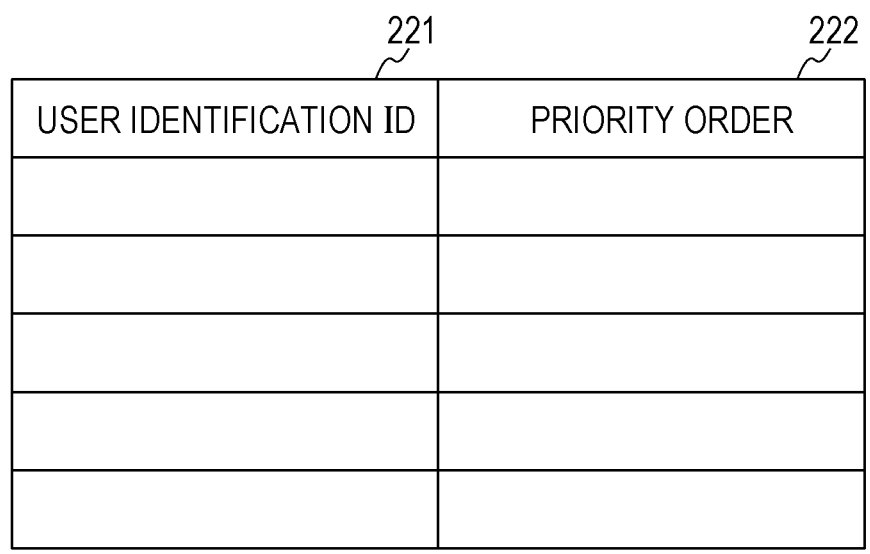
FIG. 16 is a user priority management table.

FIG. 16 illustrates a configuration example of the user priority management table 82. The user priority management table 82 is configured from a user identification ID 221 that serves as a search key of the user priority management table 82, and a priority order 222. VID, MACSA, a transmission source IP address, and the like are stored in the user identification ID 221. The class queue that stores the data packet of appropriate network use user is stored in the priority order 222.

FIG. 15 illustrates a configuration example of the packet processing module management table 83. The packet processing module management table 83 is configured from a packet processing module group ID 211 that serves as a search key of the packet processing module management table 83, a packet processing module group total bandwidth 212 that holds a current use bandwidth of the packet processing module group, a reserved packet processing module ID 213, and a busy packet processing module ID 214.

The packet processing module group total bandwidth 212 is a field that stores a data packet amount per unit time of the data packet transferred from the scheduler 95 to the packet processing module 74-n. The reserved packet processing module ID 213 is a field that stores the packet processing module belonging to the packet processing module group, and when the same packet processing module circuit is installed in a plurality of packet processing modules, the packet processing modules are managed in the same packet processing module group. At this time, IDs of the plurality of packet processing modules to which the same packet processing circuit is installed are stored in the field of the reserved packet processing module ID 213. The busy packet processing module ID 214 stores an ID of the packet processing module that is a module to which the scheduler 95 included in the group n packet processing module scheduler 92-n distributes the packet, of the reserved packet processing modules.

Referring back to FIG. 5, details of the packet reception distribution unit 73 will be described.

When the packet reception distribution unit 73 has received the packet, the packet identifying unit 91 analyzes an inside of the packet, and identifies a distribution identification ID. As the distribution identification ID, a Type value of a MAC header can be used, for example. The packet identifying unit 91 refers to the Type value of the MAC header of the received packet, and identifies the packet as a packet to be subjected to the same processing if the Type value is the same. Further, as the distribution identification ID, the physical port ID of the physical port that has received the packet can be used. In this case, when the identification ID of the physical port where the packet has arrived is provided to the received packet, the packet identifying unit 91 identifies the packet as a packet to be subjected to the same processing if the identification ID of the physical port is the same value. Further, when the received packets can be classified into a series of a group, using a Port ID of a TCP header or the like, such information can be used as the distribution identification ID, and with which information the received packet is identified may just be set to the packet identifying unit 91.

When having identified the distribution identification ID, the packet identifying unit 91 searches the packet distribution table 81 using the identified distribution identification ID. The packet identifying unit 91 searches the packet distribution table 81 using the distribution identification ID, as the search key, thereby to identify the packet processing module group that processes the received packet, and transfers the packet to the group n packet processing module scheduler 92-n of the identified packet processing module group.

When having received the packet from the packet identifying unit 91, the group n packet processing module scheduler 92-n identifies the priority order of the packet from an arbitrary field of the received packet, and stores the packet in the corresponding class queue (here, either in the high-priority queue 93 or the low-priority queue 94). Further, as another method of determining the class queue in which the packet is stored, the group n packet processing module scheduler 92-n may refer to the user priority management table 82 to identify the network use user and the priority of the network use user, and determine the class queue in which the packet is stored. The group n packet processing module scheduler 92-n searches the user priority management table 82 using the user identification ID as the search key, and identifies the class queue in which the packet is stored.

Further, when the packet has been stored in the class queue, the scheduler 95 included in the group n packet processing module scheduler 92-n refers to the packet processing module management table 83 to identify the busy packet processing module ID 214 that is an available packet processing module from among the packet processing modules belonging to the group, and transfers the packet to an arbitrary packet processing module.

The scheduler 95 searches the packet processing module management table 83 with the packet processing module group ID of the own group, determines the transfer destination of the data packet by acquiring the busy packet processing module ID 214, and transfers the data packet read from the class queue to the determined packet processing module. When a plurality of data packets is stored in the class queue, the scheduler 95 reads the data packet from the class queue with a higher priority, and transfers the data packet to the packet processing module.

Here, the communication device 30-$n$ can arbitrarily change the number of packet processing modules to be used by rewriting the packet processing module ID to be registered in the busy packet processing module ID 214 field registered in the packet processing module management table 83. When the value of the packet processing module ID registered in the busy packet processing module ID 214 field in the packet processing module management table 83 is rewritten, when the scheduler 95 is processing the data packet, the scheduler 95 can identify the packet processing module of the distribution destination of the packet, based on information before or after the rewriting. Therefore, the value of the packet processing module management table 83 does not influence on the distribution processing of the packet at all even when the value is rewritten.

Further, the scheduler 95 calculates a packet read amount per unit time, and stores a calculation result in the packet processing module group total bandwidth 211 of the packet processing module management table 83. Here, an example in which the packet processing module group total bandwidth 211 stores the data amount transferred by the scheduler 95 to the packet processing module per one second is illustrated. However, the number of data packets transferred by the scheduler 95 to the packet processing module per one second, or a total sum of the data amount or a total sum of the number of packets transferred by the scheduler 95 to the packet processing module so far may be stored. Further, a value that can be generated from the data amount of the packets and the number of packets input to the packet processing module scheduler may be held instead of the packet read amount. FIG. 15 illustrates an example in which the single packet processing module group total bandwidth 211 is managed in the group n packet processing module scheduler 92-$n$. However, for example, when the group n packet processing module scheduler 92-$n$ includes one or more class queues, the packet processing module group total bandwidth 211 for each class queue may be held.

Further, a load increase threshold and a load decrease threshold may be set to the scheduler 95. When the data amount currently being transferred by the scheduler 95 to the packet processing module exceeds the load increase threshold with respect to the data amount that can be processed in the current number of busy packet processing modules, the scheduler 95 recognizes that a load increase threshold-exceeding event has occurred, and generates an event notification command. Further, when the data amount currently being transferred by the scheduler 95 to the packet processing module falls below the load decrease threshold with respect to the data amount that can be processed in the current number of busy packet processing modules, the scheduler 95 recognizes that a load decrease threshold-exceeding event has occurred, and generates the event notification command. These event generation thresholds can be the data amount transferred by the scheduler 95 to the packet processing module per one second, or can be the number of data packets transferred by the scheduler 95 to the packet processing module per one second. In the above description, an example in which the load increase threshold and the load decrease threshold are managed in the group n packet processing module scheduler 92-$n$ as a single threshold has been described. However, for example, when the group n packet processing module 92-$n$ includes one or more class queues, the load increase threshold and the load decrease threshold may be held for each class queue.

Further, the scheduler 95 monitors data packet discard in the class queue. When packet discard has occurred in the class queue due to processing performance shortage of the packet processing module, the scheduler 95 recognizes that a discard event has occurred, and generates the event notification command. In the above description, an example in which the discard event is managed in the group n packet processing module scheduler 92-$n$ as a single event has been described. However, for example, when the group n packet processing module scheduler 92-$n$ includes one or more class queues, the data packet discard is monitored for each class queue, and the event notification command may be generated for each class queue.

Further, when having detected reception of the packet of the protocol that cannot be processed by the packet processing module circuit installed and enabled in the packet processing module 74-$n$ managed in the scheduler, the scheduler 95 generates an unsupported protocol detection event.

The scheduler 95 transmits these generated event notification commands to the NMS 20.

Next, the packet processing module 74-$n$ will be described. The packet processing module circuit having an arbitrary packet processing function is installed to the packet processing module 74-$n$ by the NMS 20. When having received the data packet from the packet reception distribution unit 73, the packet processing module 74-$n$ applies different packet processing to the received data packet for each packet processing module circuit installed in the packet processing module, and transfers the data packet to the packet multiplexing unit 75.

As an example, an operation of when the packet processing module circuit installed in the packet processing module 74-$n$ is a VLAN circuit will be described. When having received the data packet, the packet processing module 74-$n$ acquires a VID included in a VLAN tag of the received data packet from the data packet, and identifies the user who has transmitted the data packet from the VID. Following that, the packet processing module 74-$n$ identifies the transfer destination of the data packet of the user, and further identifies an MPLS-TP path (a data communication route set to the WAN) into which the data packet is transferred. When having identified the MPLS-TP path, next, the packet processing module 74-$n$ generates an MPLS-TP header for transferring the data packet in the MPLS-TP path, and encapsulates the data packet. Further, here, the packet processing module 74-$n$ can perform traffic control of policing, coloring, and the like.

In the above description, an example in which the transmission user of the data packet is identified using the VLAN, and the data packet is processed has been described. However, the communication device can install an arbitrary packet processing module circuit that can identify the transmission user of the data packet, to the packet processing module 74-$n$.

Further, the communication device 30 can uninstall the packet processing module circuit installed in the packet processing module 74-$n$ once. When the packet processing module circuit is uninstalled from the packet processing module 74-$n$, it is desirable to delete the information of the packet processing module 74-$n$ from which the packet processing module circuit has been uninstalled, from the packet processing module management table 83 of the packet reception distribution unit 73. Accordingly, uninstallation of the packet processing module circuit can be suppressed during the data packet processing in the packet processing module 74-*n*, and the data packet discard due to replacement of the packet processing module circuit can be eliminated.

Further, not only can the packet processing module 74-*n* of the communication device 30 individually install/uninstall an arbitrary packet processing module circuit, but also can set enablement and disablement of the packet processing module circuit installed in the packet processing module 74-*n*.

When having received a packet processing module circuit enablement command 304 in which "enable" of the packet processing module is set, the communication device 30-*n* enables the packet processing module circuit of the instructed packet processing. Further, at this time, the communication device 30-*n* updates the packet processing module group total bandwidth 212, the reserved packet processing module ID 213, and the busy packet processing module ID 214 of the packet processing module management table 83. Accordingly, in the line card of the communication device 30-*n*, distribution of the packet is started to a new packet processing module. Accordingly, the packet processing performance of the communication device 30-*n* is expanded.

Further, when having received a packet processing module circuit download command 303 from the NMS 20, the communication device 30-*n* installs the packet processing module circuit to the packet processing module 74-*n* specified in the packet processing module circuit download command 303 using a packet processing module circuit file 303-7 included in the packet processing module circuit download command 303. At this time, the communication device 30-*n* updates the packet processing module group total bandwidth 212, the reserved packet processing module ID 213, and the busy packet processing module ID 214 of the packet processing module management table.

Further, when having received a packet module circuit deletion command 305 from the NMS 20, the communication device 30-*n* uninstalls the packet processing module circuit of the packet processing module specified in the packet module circuit deletion command 305. At this time, the communication device 30-*n* updates the packet processing module group total bandwidth 212, the reserved packet processing module ID 213, and the busy packet processing module ID 214 of the packet processing module management table 83.

Further, when having received a "disablement" instruction of the packet processing module circuit enablement/disablement command 304, the communication device 30-*n* disables the packet processing module circuit of the packet processing module specified in the packet processing module circuit enablement/disablement command 304. At this time, the communication device 30-*n* deletes the packet processing module ID instructed in the packet processing module circuit enablement/disablement command 304 from the busy packet processing module ID 214 of the packet processing module management table 83.

For example, here, assume that the packet processing performance of a single packet processing module is 10 Gbit/s, and the same packet processing function (here, the MPLS-TP protocol processing function) is installed in three packet processing modules. At this time, the line card has the packet processing performance of the MPLS-TP data of 30 GBIT/s. Meanwhile, when a MPLS-TP data packet of 15 Gbit/s has flown in the line card, the communication device 30-*n* of the present invention disables the packet processing module circuit of one packet processing module, and enables the packet processing module circuits of two of three packet processing modules, thereby to process all of received MPLS-TP data packets. At this time, in the field of the busy packet processing module ID 214, the packet processing module ID of the packet processing module being in operation (that is, the packet processing module to which the packet is distributed). The packet processing module circuit of the packet processing module is disabled, whereby power supply to the packet processing module can be stopped, and thus power saving effect can be expected.

Accordingly, the communication operator purchases (that is, downloads) or enables only the packet processing function/packet processing performance necessary for processing the packets flowing into the communication device 30, and disables or deletes an unnecessary packet processing function, thereby to reduce the network build cost and the maintenance cost of the communication operator.

The packet multiplexing unit 75 receives the data packets to which specific packet processing has been applied in the packet processing module 74-*n*, multiplexes the data packets, and transfers the multiplexed data packet to the SW transmitting circuit 76.

The SW transmitting circuit 76 is a circuit having a function to convert the data packet into a format for transferring the data packet from the line card to an SW card. When having received the data packet from the packet multiplexing unit 75, the SW transmitting circuit 76 performs the format conversion of the data packet, and transfers the format-converted data packet to the SW card.

The SW receiving circuit 77 receives the data packet from the SW card, and adjusts the data packet to a format to be processed in the line card. When having received the data packet from the SW card, the SW receiving circuit 77 performs the format conversion of the data packet, and transfers the format-converted data packet to the packet distribution unit 78 or the transmitting circuit 72.

The packet distribution unit 78 is a circuit included in the line card including a plurality of the transmitting circuits 72-*n*. The packet distribution unit 78 identifies the physical port of the output destination of the data packet when having received the data packet from the SW receiving circuit 77, and transfers the data packet to the transmitting circuit 72-*n* connected with the physical port of the output destination.

The card controller 79 communicates with the device controller 34. Further, the card controller 79 performs setting of a specific value to each packet processing module on the line card. Further, the card controller 79 collects status information that indicates enablement/disablement of each packet processing module circuit and performance information held in each packet processing module, and notifies the collected information to the device controller 34.

The UNI line card 31 and the NNI line card 32 of the communication device 30-*n* that configures the network system of the present invention include a plurality of rewritable packet processing modules as described above. The packet processing module circuits installed in the packet processing modules are changed according to the protocol used in the communication service accommodated in the UNI line card 31 of the communication device 30-*n*. Accordingly, the same UNI line card 31 can accommodate various communication services. Further, the number of the packet processing module circuits installed to the packet processing modules are changed according to increase/decrease of the amount of traffic of the communication service accommodated in the UNI line card 31. Therefore, necessary and sufficient packet processing performance can be flexibly realized on the UNI line card 31

[Examples of Commands]

Figure 17:
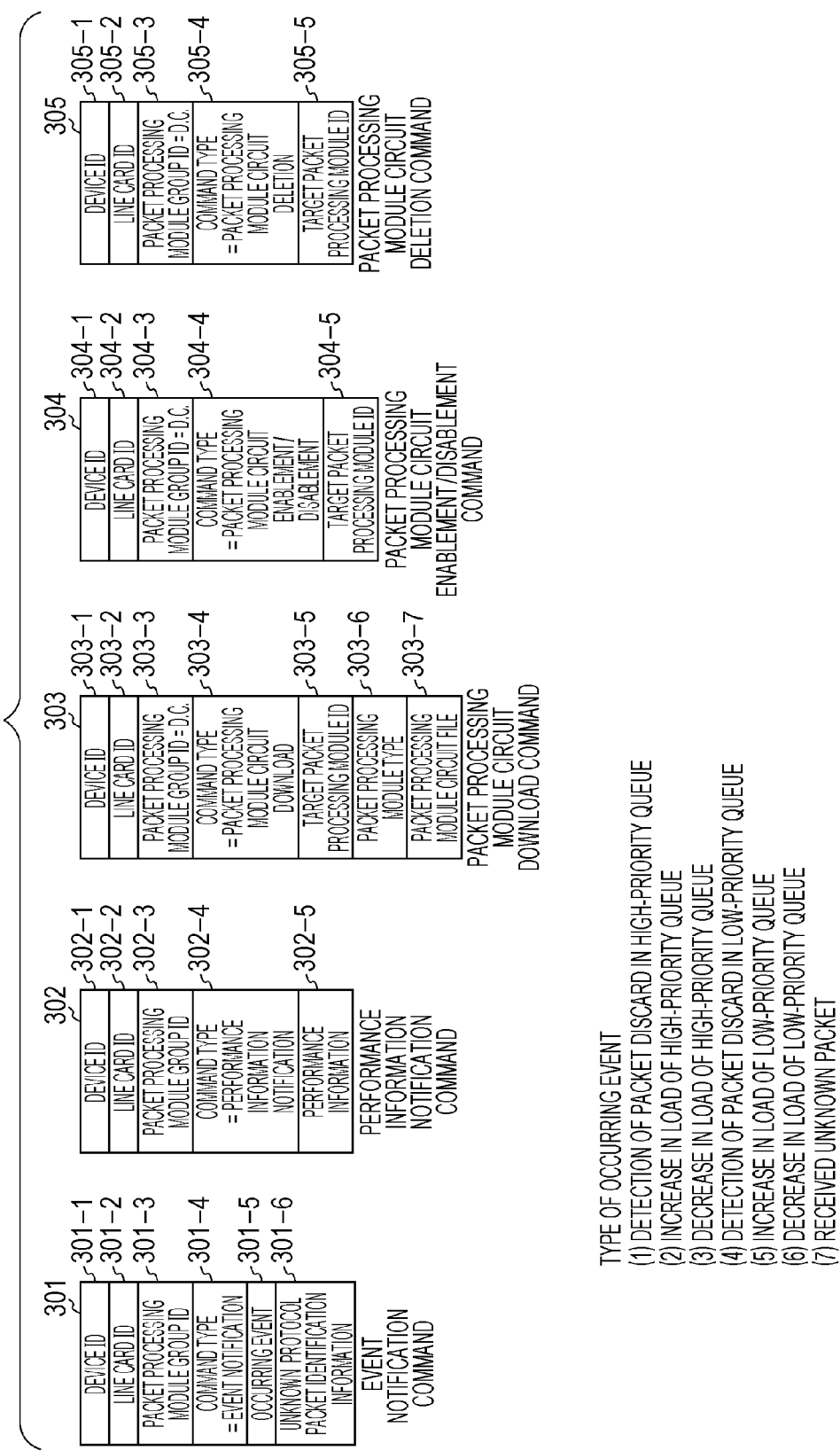
FIG. 17 is an example of a command format used in communication between a device and a network management system.

FIG. 17 illustrates examples of formats of commands exchanged between the communication device 30-*n* and the NMS 20.

There are two types of commands received by the NMS 20 from the communication device 30, which are an event notification command 301 and a performance information notification command 302. The commands are respectively configured from common units that hold common information regardless of the command type, and individual units that have different contents for the respective command. The common units are respectively configured from device IDs 301-1 and 302-1, line card IDs 301-2 and 302-2, packet processing module group IDs 301-3 and 302-3, and command types 301-4 and 302-4.

The device IDs 301-1 and 302-1 are fields that store the device IDs of the communication devices 30-*n* that have transmitted the commands. The line card IDs 301-2 and 302-2 are fields that store identification IDs of the line cards of the communication devices 30-*n* that have transmitted the commands. The packet processing module group IDs 301-3 and 302-3 are IDS that identify the packet processing module groups included in the line cards of the communication devices 30-*n* that have transmitted the commands. By a combination of these three fields, from which packet processing module group of the line card of the communication device 30-*n* the command has been transmitted can be uniquely identified. The command type is a field that stores the type of the command. Examples of the command type transmitted from the communication device 30 include event notification and performance information notification.

Next, the individual units of the commands will be described. The individual unit of the event notification command 301 is configured from an occurring event field 301-5 and unknown protocol packet identification information 301-6.

Contents of an occurring event are held in the occurring event field 301-5. Examples of events held in the occurring event field 301-5 are as follows:

(1) Detection of data packet discard in the high-priority queue (2) An increase in the load in the high-priority queue (3) A decrease in the load in the high-priority queue (4) Detection of data packet discard in the low-priority queue (5) An increase in the load in the low-priority queue (6) A decrease in the load in the low-priority queue (7) Received an unknown packet Further, the unknown protocol packet identification information field 301-6 stores information, which is used only when the command is a command that notifies the occurring event "(7) Received an unknown packet", and can identify the type of the protocol of the received packet, in the unknown protocol packet identification information field 301-6.

Next, the performance information notification command 302 will be described. The device ID 302-1, the line card ID 302-2, the packet processing module group ID 302-3, and the command type 302-4 of the common unit are the same as those of the event notification command 301, and thus description is omitted. The command individual unit of the performance information notification command 302 will be described. The individual unit of the performance information notification command 302 includes a performance information field. The line card of the communication device 30-*n*, and the performance information acquired from the packet processing module are stored in a performance information field 302-5. Examples of the performance information include the number of received packets, a received byte number, the number of transmitted packets, a transmitted byte number, the number of discarded frames, a reception rate, and a transmission rate. These pieces of performance information are transmitted from the communication device 30-*n* in various units, such as device units, line card units, packet processing module units, or user units.

There are three types of commands transmitted from the NMS 20 to the communication device, which are a packet processing module circuit download command 303, a packet processing module circuit enablement/disablement command 304, and a packet processing module circuit deletion command 305. The commands are respectively configured from common units that hold common information regardless of the command type, and individual units having different contents for the respective commands.

The common units are respectively configured from device IDs 303-1, 304-1, and 305-1, line card IDs 303-2, 304-2, and 305-2, packet processing module group IDs 303-3, 304-3, and 305-3, command types 303-4, 304-4, and 305-4, and target packet processing module IDs 303-5, 304-4, and 305-5. The device IDs 303-1, 304-1, and 305-1 are fields that store the identification IDs of the communication devices 30-*n* that are supposed to receive the commands. The line card IDs 303-2, 304-2, and 305-2 are fields that store the identification IDs of the line cards of the communication devices that are supposed to receive the commands. The packet processing module group ID 303-3, 304-3, and 305-3 are fields that store the IDs for identifying the packet processing module groups included in the line cards of the communication devices 30-*n* that are supposed to receive the commands. The command type 303-4, 304-4, and 305-4 are fields that hold the types of the commands. Examples of the command types transmitted by the NMS 20 include packet processing module circuit download, packet processing module circuit enablement/disablement, and packet processing module circuit deletion. The target packet processing module ID 303-5, 304-4, and 305-5 are fields that store the identification IDs of the packet processing modules 74-*n* in which some sort of actions are executed by the commands. The communication device 30-*n* can uniquely identify to which packet processing module 74-*n* of the line card of the communication device 30-*n* the command is intended to be transmitted, by a combination of the four fields of the device ID, the line card I, the packet processing module group ID, and the target packet processing module ID of the command received from the NMS 20.

Next, the individual units of the commands will be described. The individual unit of the packet processing module circuit download command 303 is configured from a packet processing module type 303-6 and a packet processing module circuit file 303-7. The packet processing module type 303-6 is a field that stores the packet processing module type installed in the packet processing module of the communication device 30-*n* by the packet processing module circuit download command 303. The packet processing module circuit file 303-7 is a field that holds the program information of the packet processing module circuit installed to the packet processing module 74-*n* of the communication device 30-*n* by the packet processing module circuit download command 303. When the program information is large, the NMS 20 may divide the packet processing module circuit download command 303 into a plurality of sections, and transmit the divided sections. There is no individual unit in the packet processing module circuit enablement/disablement command 304 and the packet processing module circuit deletion command 305.

[Examples of Processing Sequences Among Devices]

Figure 18:
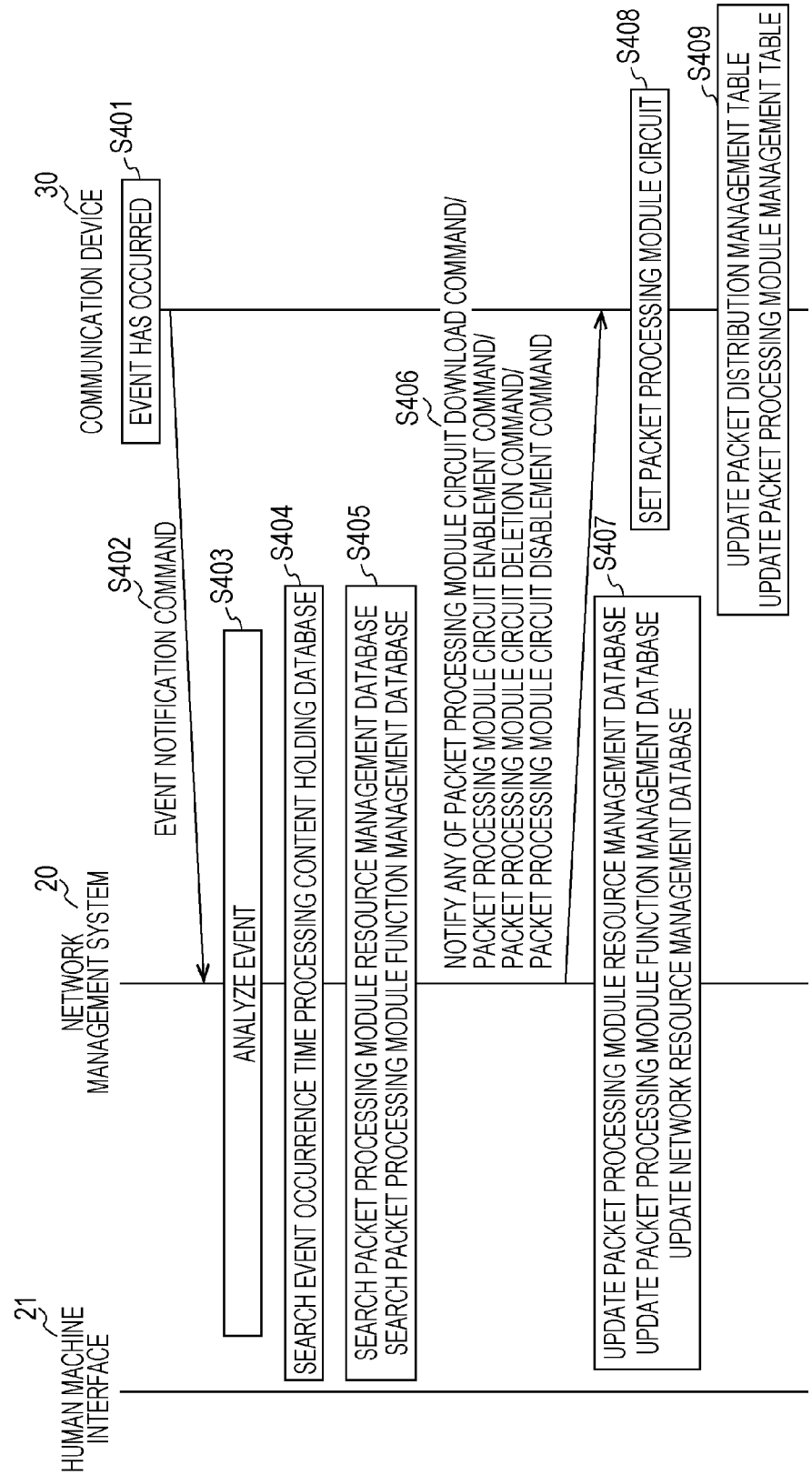
FIG. 18 is a processing sequence diagram of when a network management system automatically performs processing upon receiving event notification from a communication device.
Figure 19:
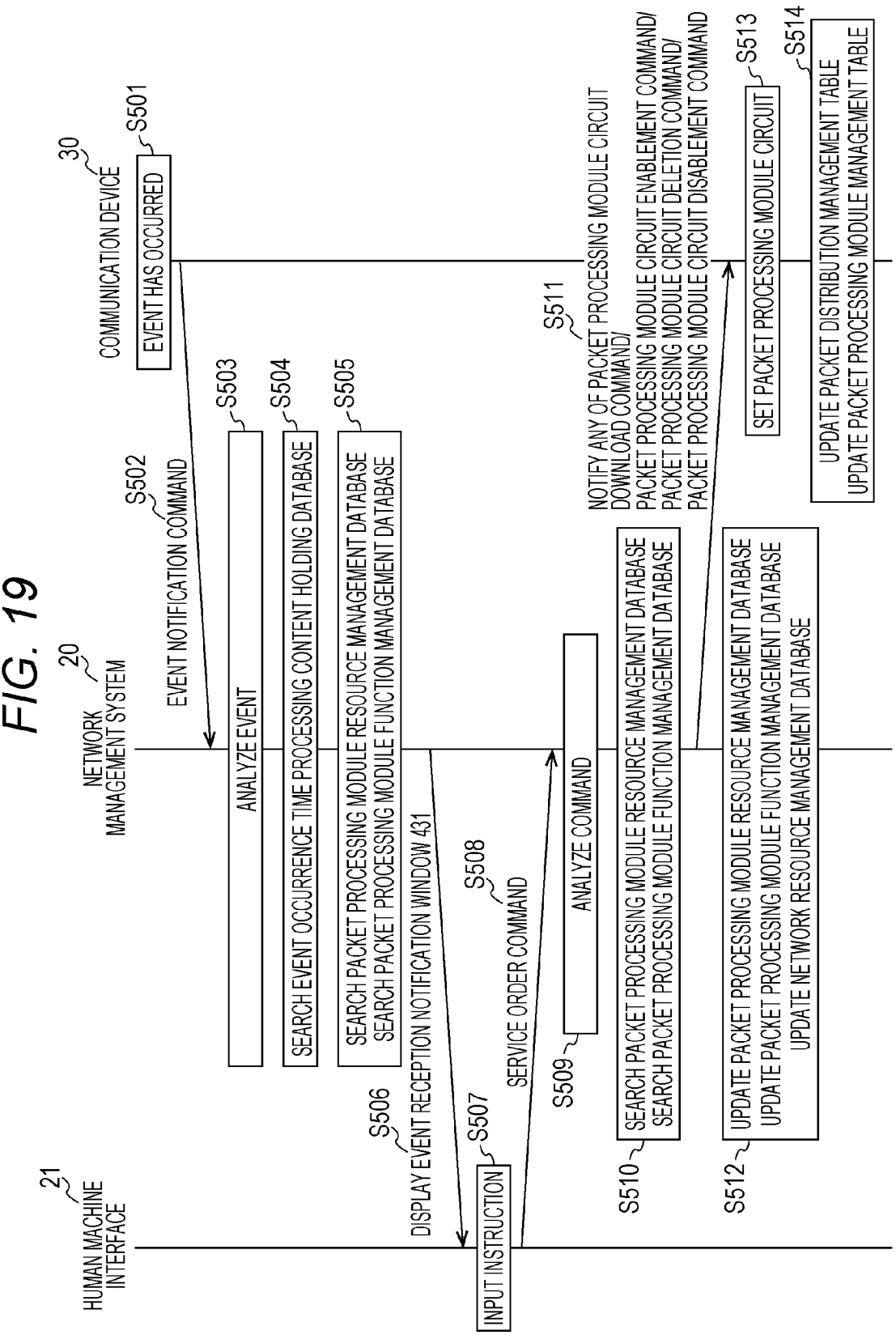
FIG. 19 is a processing sequence diagram of when a maintenance person action is expected upon receiving event notification from a communication device.
Figure 20:
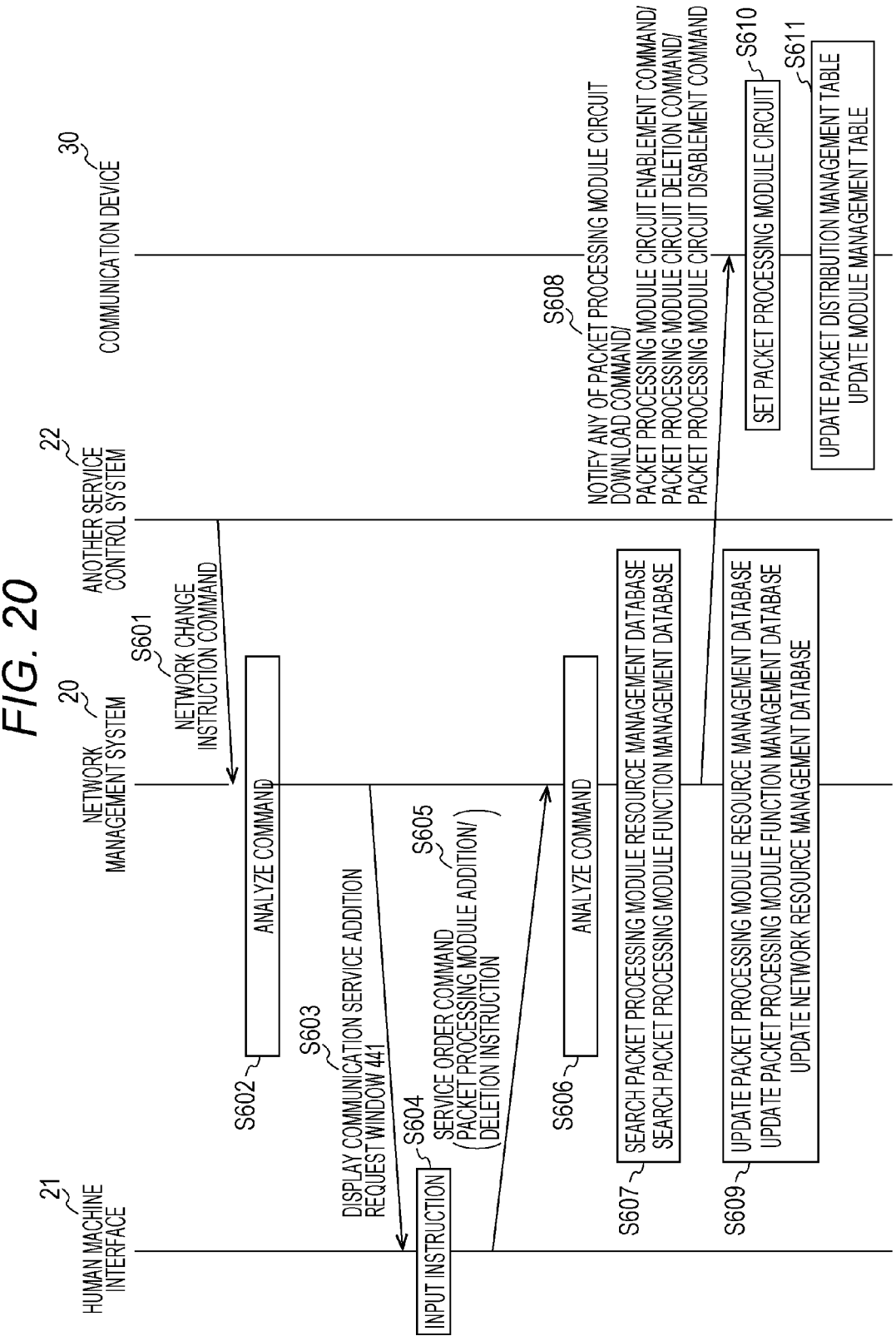
FIG. 20 is a processing sequence diagram of when a service addition request has been given from a peripheral control system to the network management system.

FIGS. 18 to 20 illustrate processing sequences indicating exchange of information among the NMS 20, the communication device 30-*n*, and the human machine interface 21.

FIG. 18 is an example of a processing sequence of when an event has occurred in the communication device 30-*n*.

When an event has occurred in the communication device 30-*n* (S401), the communication device 30-*n* transmits the event notification command 301 to the NMS 20 (S402).

When having received the event notification command 301, the NMS 20 analyzes the event notification command 301, and identifies the occurring event (S403). The NMS 20 searches the action database 67, based on contents of the identified occurring event, and identifies which of the "packet processing module automatic addition", the "packet processing module automatic reduction", and the "packet processing module disablement" the action is (S404). When the action is any one of the "packet processing module automatic addition", the "packet processing module automatic reduction", and the "packet processing module disablement", the NMS 20 searches the packet processing module resource management database 61 and the packet processing module function management database 62, based on information included in the identified action and the event notification command 301 (S406), and transmits any one of the packet processing module circuit download command 303, the packet processing module circuit enablement/disablement command 304, and the packet processing module circuit deletion command 305 to the communication device 30-*n* (S406).

Further, the NMS 20 updates the packet processing module resource management database 61, the packet processing module function management database 62, and the network resource management database 64, based on a processing result of S405 (S407).

When having received any command from the NMS 20, the communication device 30-*n* sets the packet processing module according to the command (S408). Further, the communication device 30-*n* updates the packet distribution table 81 and the packet processing module management table 83 according to a result of S408 (S409). Here, the "setting the packet processing module" refers to processing of installing the packet processing module circuit to the packet processing module, uninstalling the packet processing module circuit installed in the packet processing module, enabling or disabling the packet processing module circuit installed in the packet processing module.

As described above, the packet processing function and the packet processing performance of the packet processing module can be increased/decreased according to the use state of the packet processing module. Therefore, the communication operator can introduce the communication service with a necessary minimum packet processing function or packet processing performance, and can increase/decrease the packet processing function and the packet processing performance of the packet processing module as needed, whereby the communication operator can reduce the network build cost and the maintenance cost.

FIG. 19 is an example of a processing sequence of when display to prompt update of the packet processing module is displayed in the human machine interface when an event has occurred in the communication device 30-*n*, and the packet processing module of the communication device 30-*n* is set as a result.

When an event has occurred in the communication device 30-*n* (S501), the communication device 30-*n* transmits the event notification command 301 to the NMS 20 (S502). When having received the event notification command 301, the NMS 20 analyzes the event notification command, and identifies the occurring event (S503). The NMS 20 searches the action database 67, based on the contents of the occurring event, and identifies whether the action is the "packet processing module addition recommendation screen display" (S504). When the action is the "packet processing module addition recommendation screen display", the NMS 20 searches the packet processing module resource management database 61 and the packet processing module function management database 62, based on information included in the event notification command 301 (S505), and transmits, to the human machine interface 21, communication service addition confirmation screen display information for displaying the event reception notification window 431 in the human machine interface 21 (S506). The human machine interface 21 displays the event reception notification window 431, based on information received from the communication device 30-*n*. The event reception notification window 431 will be described below using FIG. 24.

The human machine interface 21 transmits a service order command to the NMS 20 (S508), based on the information input from the operator (S507). The NMS 20 analyzes the received service order command (S509), and when the service order is any of "packet processing module addition", "packet processing module circuit deletion", and "packet processing module circuit disablement", the NMS 20 searches the packet processing module resource management database 61 and the packet processing module function management database, based on contents of the service order and information included in the service order command (S510), generates any one of the packet processing module circuit download command 303, the packet processing module circuit enablement/disablement command 304, and the packet processing module circuit deletion command 305, and transmits the generated command to an appropriate communication device 30-*n* (S511).

Further, the NMS 20 updates the packet processing module resource management database 61, the packet processing module function management database 62, and the network resource management database 64 (S512). When having received any command, the communication device 30-*n* sets the packet processing module according to the command (S513). Further, the communication device 30-*n* updates the packet distribution table 81 and the packet processing module management table 83, according to a result of S513 (S514).

As described above, the packet processing function and the packet processing performance of the packet processing module can be increased/decreased according to the use status of the packet processing modules. Further, when a new communication service is added, and a packet of a type (protocol) that is supposed to be processed with a packet processing function not provided in the communication device 30-*n* is detected in the communication device 30-*n*, the packet processing function of the packet processing module can be added. Therefore, the communication operator can introduce the communication service with a necessary minimum packet processing function or packet processing performance, and can increase/decrease the packet processing function and the packet processing performance of the packet processing module as needed, whereby the communication operator can reduce the network build cost and the maintenance cost.

FIG. 20 is an example of a processing sequence from when the NMS 20 receives a network change instruction command from another control system until when the communication device 30-*n* sets the packet processing module.

When having received the network change instruction command from another control system (S601), the NMS 20 analyzes the command (S602). When contents of the command is either "addition of a new communication service", or "deletion of the existing communication service", the NMS 20 notifies information for displaying the communication service addition request window 441 in the human machine interface 21 (S603).

Figure 25:
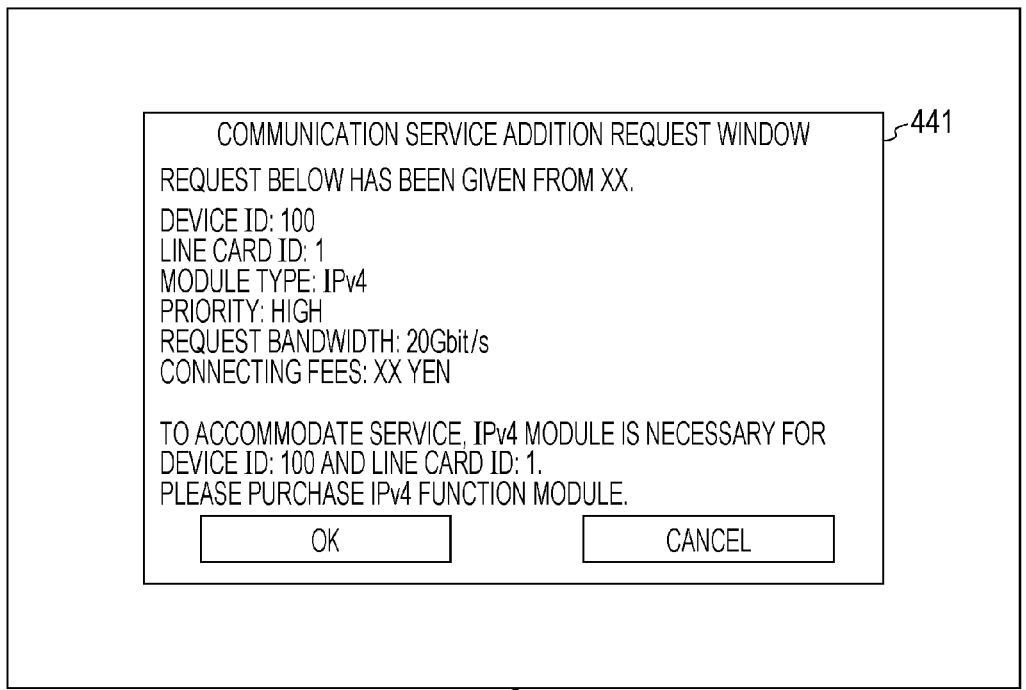
FIG. 25 is an example of an operator notification screen of when a service addition request has been given from another control system to the network management system.

The human machine interface 21 displays the communication service addition request window 441, based on the information received from the communication device 30-*n* (S604). An example of the communication service addition request window 441 is illustrated in FIG. 25.

The human machine interface 21 transmits the service order command to the NMS 20, based on the information input from the operator (S605). S606 to S611 are similar to S509 to S514.

Conventionally, after having a meeting between the network operator who manages the another control system, and the network operator of the communication operator who manages the NMS 20, the network operator of the communication operator who manages the NMS 20 designs network accommodation of the WAN 40. Following that, the operator of the communication operator who manages the NMS 20 needs to accommodate a new user through processes of setting the network of the WAN 40, and setting the communication device 30-*n*. However, according to the present invention, the control system can cooperate with another control system, and reduction of working man-hours of the operator and a decrease in a lead time to accommodate the communication service become possible.

Further, the NMS 20 notifies, to a communication device vendor (not illustrated) who provides the communication device 30-*n*, information including the setting status (to be specific, the packet processing module type 114 and the status 115) of the packet processing module circuit of the packet processing module managed in the packet processing module function management database 62, and timing when the NMS 20 notifies the setting status of the packet processing module circuit of the packet processing module may be periodical timing, or may be timing when the setting of the packet processing module is changed and the packet processing module function management database 62 is updated.

[Processing Flow of NMS 20]

Figure 21:
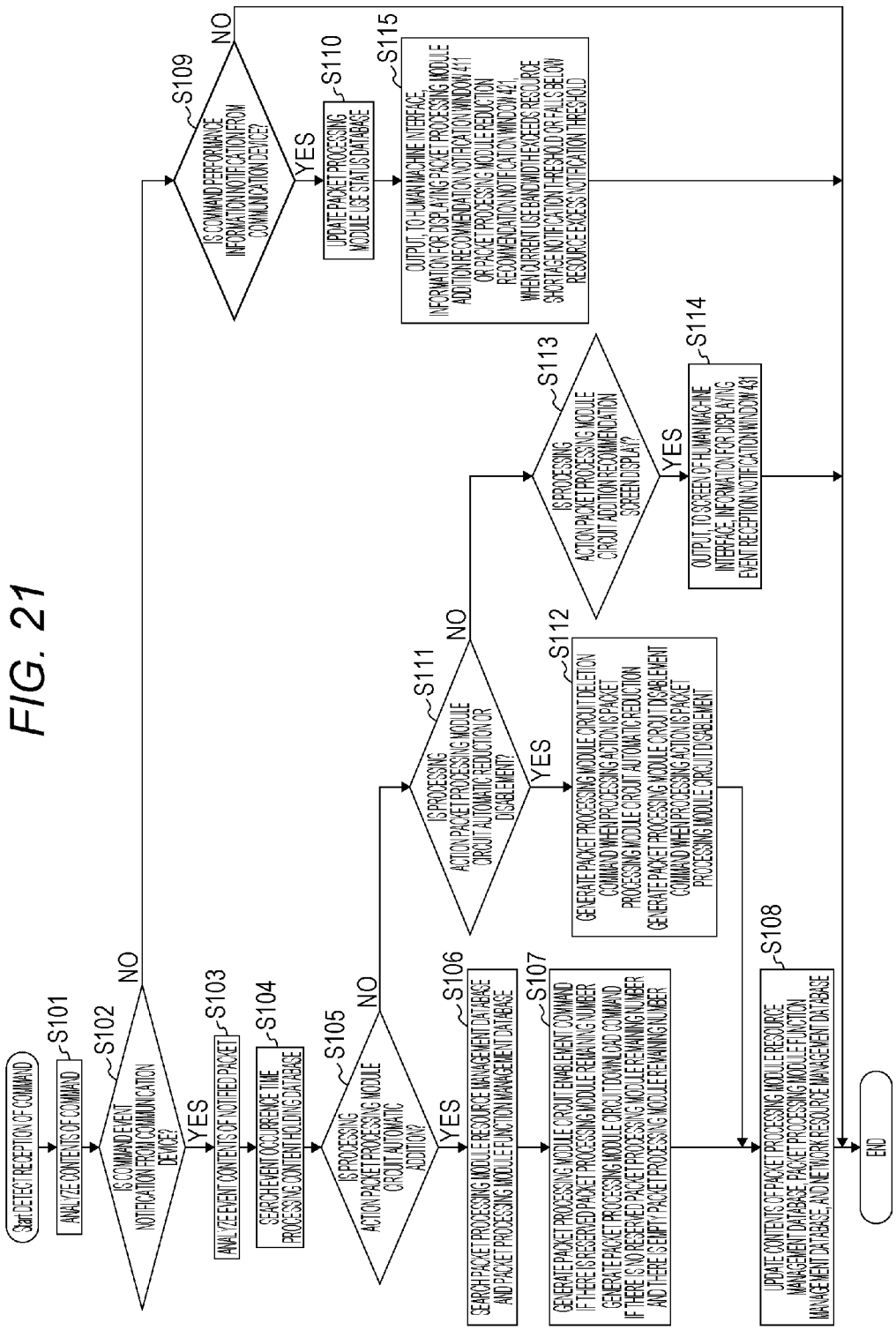
FIG. 21 is a processing flow of when the network management system has received a command from a device.

FIG. 21 is a flowchart for describing processing executed by the packet processing module calculation unit 51 and the packet processing module circuit download unit 52 of when the NMS 20 has received the event notification command 301 that notifies occurrence of any event in the communication device 30, or has received the performance information notification command 302 that notifies the performance information from the communication device 30.

First, when having received the command from the communication device 30 through the communication device control interface 43, the packet processing module calculation unit 51 analyzes contents of the command (S101).

Processing is changed according to whether the received command is the event notification command 301 from the communication device 30-*n*, or the performance information notification command 302 from the communication device 30-*n* (S102).

First, a processing example of when the command type is the event notification from the communication device will be described. When the command type is the event notification command 301 from the communication device 30-*n*, the packet processing module calculation unit 51 analyzes the event of the event notification command 301 (S103). Next, the packet processing module calculation unit 51 searches the action database 67 using the contents of the occurring event 301-5 of the event notification command 301 received from the communication device 30-*n*, as the search key (S104).

Here, a processing example of when the action is the "packet processing module circuit automatic addition" will be described.

As a result of the search of the action database 67, when the action corresponding to the occurring event is the "packet processing module circuit automatic addition" (S105), the packet processing module calculation unit 51 searches the packet processing module resource management database 61 and the packet processing module function management database 62 using the device ID 301-1, the line card ID 301-2, and the packet processing module group ID 301-3 included in the event notification command 301, as the search key, and identifies: the number of packet processing modules, to which the packet processing module circuits have been installed, but the packet processing module circuits are disabled, of the reserved packet processing modules 108 of the packet processing module group ID of the line card of the communication device 30-*n* (hereinafter, "reserved packet processing module remaining number"); the number of packet processing modules to which the packet processing module circuits have not been installed, of the packet processing module number 103 (hereinafter, "empty packet processing module remaining number"); and which packet processing module circuit is installed in which packet processing module (S106).

The packet processing module circuit download unit 52 generates the packet processing module circuit enablement command 304 if the reserved packet processing module remaining number is not zero in the packet processing modules belonging to the module group ID of the line card of the communication device 30-*n*. When the reserved packet processing module remaining number is zero, and the empty packet processing module remaining number is not zero, in the packet processing modules belonging to the module group ID of the line card of the communication device 30-*n*, the packet processing module circuit download unit 52 acquires the program information of the packet processing module circuit from the packet processing module circuit database 68, and generates the packet processing module circuit download command including the program information of the acquired packet processing module circuit (S107).

The processing of S107 will be described in detail. At S107, the NMS 20 transmits the packet processing module circuit enablement/disablement command 304 to the communication device 30-*n* if the reserved packet processing module remaining number is not zero, based on the information acquired from the packet processing module resource management database 61. To be specific, at S107, the packet processing module circuit download unit 52 acquires the reserved packet processing module number 106 and the busy packet processing module number 107 corresponding to the device ID 301-1, the line card ID 301-2, and the packet processing module ID 301-3 included in the command, from the packet processing module resource management database 61, and when the acquired busy packet processing module number 107 is smaller than the acquired reserved packet processing module number 106, the packet processing module circuit download unit 52 stores the "packet processing module circuit enablement" in the command type 304-4 of the packet processing module circuit enablement/disablement command, and sets the packet processing module ID of the packet processing module to which the packet processing module circuit to be enabled is installed, to the field of the target packet processing module ID. The packet processing module type 105 is identified with the communication device ID 301-3, the line card ID 301-2, and the packet processing module group ID 301-3 included in the command, in the packet processing module function management database, and the packet processing module ID with the disabled status 115, of the packet processing modules corresponding to the packet processing module type specified by the packet processing module type 114 of the packet processing module function management database, to a target packet processing module ID to be set to the command. The NMS 20 transmits the packet processing module circuit enablement/disablement command 304 generated as described above, through the communication device control interface 43. Accordingly, the NMS 20 instructs enablement of the packet processing module circuit to the communication device 30-n.

Accordingly, the packet processing module circuit of the packet processing module can be enabled according to the use status of the packet processing modules of the communication device 30-n. Therefore, for example, a system of a business to charge the communication operator for the used packet processing module, that is, the packet processing module with the enabled packet processing module circuit. Further, necessary packet processing module circuits of packet processing modules are enabled according to the use status of the packet processing modules, whereby the power consumption of the communication device 30-n can be decreased.

Meanwhile, at S107, the packet processing module circuit download unit 52 acquires the reserved packet processing module number 106 and the busy packet processing module number 107 corresponding to the device ID 301-1, the line card ID 301-2, and the packet processing module ID 301-3 included in the command, from the packet processing module resource management database 61, and calculates a sum of the reserved packet processing module number 106 in the same line card ID when a difference between the acquired reserved packet processing module number 106 and the acquired busy packet processing module number 107 is "0". The packet processing module circuit download unit 52 compares the sum obtained by the calculation and the packet processing module number 103 of the line card. When there is an unused packet processing module (that is, there is a packet processing module to which the packet processing module circuit has not been installed), the packet processing module circuit download unit 52 executes processing of installing the packet processing module circuit of an insufficient packet processing function. When there is an unused packet processing module in the line card, the packet processing module circuit download unit 52 identifies the communication device 30-n corresponding to the device ID 301-1 and the line card ID 301-2 included in the command, and the packet processing module ID with "empty" of the packet processing module type 114 of the line card, of the packet processing module function management database 62. Further, the packet processing module circuit download unit 52 refers to the packet processing module resource management database, identifies the packet processing module type 105 corresponding to the packet processing module group ID 301-3 included in the command, and acquires the program information of the identified packet processing module circuit from the packet processing module circuit database 68. The packet processing module calculation unit 51 stores the device ID 301-1, the line card ID 301-2, and the packet processing module group ID 301-3 to the device ID 303-1, the line card ID 303-2, and the packet processing module group ID 303-3 of the packet processing module circuit download command 303, stores "packet processing module download" to the command type 303-4, stores the identified packet processing module ID to the target ID 303-5, stores the acquired program information of the packet processing module circuit to the packet processing module circuit file field 303-7, and generates the packet processing module circuit download command 303.

The NMS 20 transmits the packet processing module circuit download command 303 generated as described above, through the communication device control interface 43.

Accordingly, in the line card of the communication device 30-n, distribution of the packet is started to the new packet processing module, and the packet processing performance of the communication device 30-n is expanded. With the processing, in the network system of the present invention, the packet processing module circuit can be automatically installed according to the use status of the communication device 30-n. Therefore, for example, a system of a business to charge the communication operator for the installed packet processing module can be provided. Further, necessary packet processing modules are installed according to the use status, whereby the power consumption of the communication device 30-n can be decreased.

When having generated the packet processing module circuit enablement/disablement command 304 or the packet processing module circuit download command 303, the packet processing module circuit download unit 52 updates the contents of the packet processing module resource management database 61, the packet processing module function management database 62, and the network resource management database 64 (S108). When having generated the packet processing module circuit download command 303, the packet processing module calculation unit 51 updates the network resource management database 64. To be specific, the packet processing module circuit download unit 52 updates the reserved bandwidth 123 because the reserved bandwidth is increased when a new packet processing module circuit is installed to the packet processing module 74-n.

With the processing from S101 to S108, the network system of the present invention can reinforce the packet processing performance of the communication device 30-n without manpower according to the use status of the communication device 30-n.

Next, processing executed in the packet processing module calculation unit 51 and the packet processing module circuit download unit 52 of the NMS 20 of when a use rate of a certain line card of the line cards of the communication device 30-n is decreased, and the packet processing module circuit of the packet processing module is deleted or disabled without manpower will be described.

Processing from S101 to S104 is the same as described above, and thus description is omitted.

As a result of an analysis of the command received from the communication device 30-n, the packet processing module calculation unit 51 refers to the action database 67. When the action corresponding to the occurring event 301-5 included in the command is not the "packet processing module circuit automatic addition" (S105), the packet processing module calculation unit 51 determines whether the action is the "packet processing module circuit automatic reduction" or the "packet processing module circuit disablement" (S111). When the action is the "packet processing module automatic reduction" or the "packet processing module circuit disablement", the packet processing module calculation unit 51 executes the processing of S112.

First, when the action is the "packet processing module circuit automatic reduction", the packet processing module circuit download unit 52 generates the packet processing module circuit deletion command 305 to be transmitted to the line card of the communication device 30-n (S112). To be specific, the packet processing module calculation unit 51 searches the packet processing module resource management database 61 using the device ID 301-1, the line card ID 301-2, and the packet processing module group ID 301-3 of the event notification command 301 received from the communication device 30-n, as the search keys, and identifies the packet processing module type 105 of the packet processing module group ID 104, which is an object to be deleted. Next, the packet processing module calculation unit 51 searches the packet processing module function management database 62 using the device ID 301-1 and the line card ID 301-2 of the event notification command 301 received from the communication device 30-n and the identified packet processing module type, as the search keys, and identifies the packet processing module ID 113 to which the packet processing module circuit as the object to be deleted is installed. When there is a plurality of the identified packet processing module IDs 113, one of the plurality of the packet processing module IDs 113 may be arbitrarily identified. When the packet processing module ID 113 has been identified, the packet processing module circuit download unit 52 generates the packet processing module circuit deletion command 305. The NMS 20 transmits the packet processing module circuit deletion command 305 to the communication device 30-n through the communication device control interface 43. The NMS 20 respectively stores the device ID 301-1, the line card ID 301-2, and the packet processing module ID 301-3 to the device ID 305-1, the line card ID 305-2, and the packet processing module ID 305-3 of the packet processing module circuit deletion command 305, stores the "packet processing module circuit deletion" to the command type 305-4, and stores the identified packet processing module ID to the target packet processing module ID 305-5. Accordingly, in the line card of the communication device 30-n, distribution of the packet to the packet processing module, from which the packet processing module circuit has been uninstalled (deleted), is stopped, and the packet processing performance is reduced.

Accordingly, the packet processing module circuit can be uninstalled without manpower according to the use status of the communication device 30-n. Therefore, for example, a system of a business to charge the communication operator for the installed packet processing module can be provided.

Next, when the packet processing module calculation unit 51 has determined at Sill that the action is the "packet processing module circuit disablement", the packet processing module circuit download unit 52 generates the processing module circuit enablement/disablement command 304 to be transmitted to the line card of the communication device 30-n (S112). To be specific, the packet processing module calculation unit 51 searches the packet processing module resource management database 61 using the device ID 301-1, the line card ID 301-2, and the module group ID 301-3 of the event notification command 301 received from the communication device 30-n, as the search keys, and identifies the packet processing module type 105 of the packet processing module group ID, which is an object to be disabled. Next, the packet processing module calculation unit 51 searches the packet processing module function management database 62 using the device ID 301-1 and the line card ID 301-2, and the identified packet processing module type, as the search keys, and identifies the packet processing module ID 113 with the "enablement" status 115, of the packet processing modules 74-n to which the packet processing module circuit to be disabled is installed. When there is a plurality of the identified packet processing module IDs 113, one of the plurality of packet processing module IDs 113 may be arbitrarily identified. When the packet processing module ID 113 to be disabled has been identified, the packet processing module circuit download unit 52 generates a "disablement" instruction of the packet processing module circuit enablement/disablement command 304. The packet processing module circuit download unit 52 respectively stores the device ID 301-1, the line card ID 301-2, and the packet processing module ID 301-3 to the device ID 305-1, the line card ID 305-2, and the packet processing module ID 305-3 of the packet processing module circuit enablement/disablement command 304, stores the "packet processing module circuit disablement" to the command type 305-4, and stores the identified packet processing module ID to the target packet processing module ID 305-5. Accordingly, in the line card of the communication device 30-n, distribution of the packet to the packet processing module, from which the packet processing module circuit has been disabled, is stopped. Accordingly, the packet processing performance of the line card can be reduced.

With the processing, the packet processing module circuit of the packet processing module can be disabled without manpower according to the use status of the communication device 30-n. Therefore, a system of a business to charge the communication operator for the used packet processing module, that is, the packet processing module in which the packet processing module circuit is enabled can be provided.

When having generated the packet processing module circuit disable command or the packet processing module circuit deletion command, the packet processing module circuit download unit 52 updates the contents of the packet processing module resource management database 61, the packet processing module function management database 62, and the network resource management database 64 (S108). The packet processing module circuit download unit 52 updates the network resource management database 64 when generating the packet processing module circuit deletion command. The packet processing module circuit download unit 52 updates the reserved bandwidth 123 because the reserved bandwidth is decreased when the packet processing module circuit is uninstalled.

With the processing from S101 to S105, from S111 to S112, and S108, the network system of the present invention can reduce the packet processing performance without manpower according to the use status of the communication device 30-n.

Next, processing of when the setting of the event notification command 301 is setting to add the packet processing module according to determination of the network operator, as a result of an analysis of the command received from the communication device 30-n by the packet processing module calculation unit 51 of the NMS 20 will be described.

Processing from S101 to S104 is the same as described above, and description is omitted.

As a result of the analysis of the command transmitted from the communication device 30-*n*, the packet processing module calculation unit 51 refers to the action database 67, and when the action corresponding to the occurring event 301-5 included in the event notification command 301 is not the "packet processing module circuit automatic addition" (S105), and is also not the "packet processing module circuit automatic reduction" and the "packet processing module circuit disablement" (S111), the packet processing module calculation unit 51 determines whether the action is the "packet processing module circuit addition recommendation screen display" (S113).

When the action corresponding to the occurring event 301-5 included in the event notification command is the "packet processing module addition recommendation screen display", the packet processing module calculation unit 51 outputs information for displaying the contents of the device ID 301-1, the line card ID 301-2, the packet processing module group ID 301-3, the occurring event 301-5, and the unknown protocol packet identification information 301-6 of the received event notification command 301 in the screen of the human machine interface 21, through the human machine interface connection interface 44 (S114). Charge information necessary for adding (purchasing) the packet processing module circuit may be included. The event reception notification window 431 displayed in the human machine interface 21 will be described below in FIG. 24.

Accordingly, the operator who operates the human machine interface 21 can confirm the status notification from the communication device 30-*n* through the human machine interface 21, and can execute a maintenance action such as addition or deletion of the packet processing module circuit according to the occurring event.

Next, a case where the packet processing module calculation unit 51 of the NMS 20 has determined that the command from the communication device 30-*n* is the performance information notification command 302, as a result of an analysis of the command received from the communication device 30-*n* will be described.

Processing of S101 is the same as described above, and thus description is omitted. At S102, when the command is not the event notification command 301, as a result of confirmation of a command type field 302-4 of the command, the packet processing module calculation unit 51 moves to processing of S109.

When having determined at S109 that the command received from the communication device 30-*n* is the performance information notification command 302, the packet processing module calculation unit 51 moves to processing of S110 (S109).

When having received the performance information notification command 302, the packet processing module calculation unit 51 performs update processing of the packet processing module status database 66, based on performance information 302-5 included in the command (S110).

In an example, the packet processing module status database 66 holds the current time use bandwidth 145, the time zone A use bandwidth 146, and the time zone B use bandwidth 147 for each packet processing module type. Therefore, the packet processing module calculation unit 51 updates the current time use bandwidth 145 with a value acquired from the performance information field of the performance information notification command 302, and updates the use bandwidth of the time zone A or the time zone B corresponding to the current time. In use bandwidth fields of the time zone A and the time zone B, average use bandwidths of the respective time zones are stored.

Finally, the packet processing module calculation unit 51 calculates a current use rate from the values of the current time use bandwidth 145 and the total bandwidth 144 after update of the packet processing module status database, and compares the use rate with the resource shortage notification threshold 148 and the resource excess notification threshold 149. As a result of the comparison, if the use rate exceeds the resource shortage notification threshold 148 or the resource excess notification threshold 149, the packet processing module calculation unit 51 outputs, to the human machine interface 21, information for displaying an operator action plan (that is, the packet processing module circuit addition recommendation notification window 411 and the packet processing module circuit deletion recommendation notification window 421), through the human machine interface connection interface (S115). The information for displaying the operator action plan in the human machine interface 21 includes the packet processing module type corresponding to the device ID 302-1, the line card ID 302-2, and the module group ID 302-3 of the performance information notification command 302, the purchased bandwidth total (that is, the total bandwidth 144 corresponding to the packet processing module type corresponding to the module group ID 302-3 of the line card ID 302-2), the current time use bandwidth 145, and the like. Further, the charge information necessary for adding (purchasing) the packet processing module circuit may be included in the information for displaying the packet processing module circuit addition recommendation notification window 411 and the packet processing module circuit deletion recommendation notification window 421 in the human machine interface 21.

When the current time use bandwidth 145 exceeds a bandwidth calculated from a set value of the total bandwidth 144 and the resource shortage notification threshold 148 (a calculation method: the total bandwidth×the resource shortage notification threshold (ratio)), the packet processing module calculation unit 51 outputs information for displaying the packet processing module circuit addition recommendation notification window 411 in the human machine interface 21.

Further, when the current time use bandwidth 145 falls below a bandwidth calculated from the set value of the total bandwidth 144 and the resource excess notification threshold 149 (a calculation method: the total bandwidth×the resource excess notification threshold (ratio)), the packet processing module calculation unit 51 outputs information for displaying the packet processing module circuit deletion recommendation notification window 421 in the human machine interface 21. Screen examples displayed in the human machine interface 21 will be described below using FIGS. 26 and 27.

With the notification functions, addition/deletion of the packet processing module circuit can be prompted to the maintenance person according to the use status of the packet processing modules while the use state of the communication device 30-*n* is periodically monitored. Therefore, for example, a business model to charge the communication operator for the used packet processing module, that is, the installed packet processing module circuit can be provided.

Figure 22:
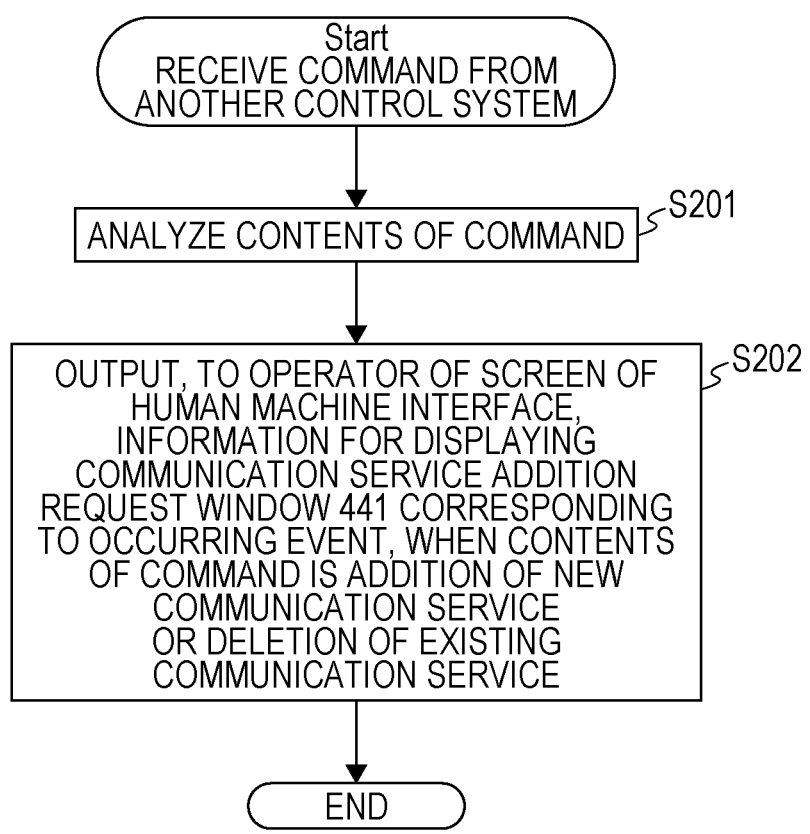
FIG. 22 is a processing flow of when the network management system has received a command from a peripheral control system.

A processing flow of the packet processing module calculation unit 51 of when the NMS 20 has received a network change instruction command form a peripheral control system (the management system 22, or the like) different from the network system of the present invention will be described with reference to FIG. 22.

When having received the network change instruction command from another control system through the management system cooperation interface 42, the packet processing module calculation unit 51 analyzes contents of the command (S201). When the contents of the network change instruction command is addition of a new communication service, or deletion of an existing communication service, the packet processing module calculation unit 51 outputs information for displaying the communication service addition request window 441 to the operator on the screen of the human machine interface 21, through the human machine interface connection interface 44 (S202). Here, the network change instruction command includes identification information of the control system that has transmitted the command, the user ID, the protocol type (IPv4 in the example of FIG. 25), the priority, a requested bandwidth, and the like.

The packet processing module calculation unit 51 refers to the packet processing module status database 66, and calculates whether the service of the packet type, the priority, and the requested bandwidth included in the network change instruction command can be accommodated in the line card of the communication device 30-*n* on the determined route. As a result of the calculation, when it is necessary to add a new packet processing module circuit to the line card of the communication device 30-*n* in order to accommodate the service of the packet type, the priority, and the requested bandwidth included in the network change instruction command, the packet processing module calculation unit 51 outputs the information for displaying the communication service addition request window 441 in the human machine interface 21. The information for displaying the communication service addition request window 441 in the human machine interface 21 includes the priority and the requested bandwidth included in the network change instruction command, the device ID and the line card ID of the communication device to which the packet processing module circuit identified by the calculation of the packet processing module calculation unit 51 needs to be added, the packet processing module type to be added, and the like. Further, the charge information necessary for adding (purchasing) the packet processing module circuit may be included in the information for displaying the communication service addition request window 441 in the human machine interface 21.

An example of the communication service addition request window 441 displayed in the human machine interface 21 will be described below with reference to FIG. 25.

Figure 23:
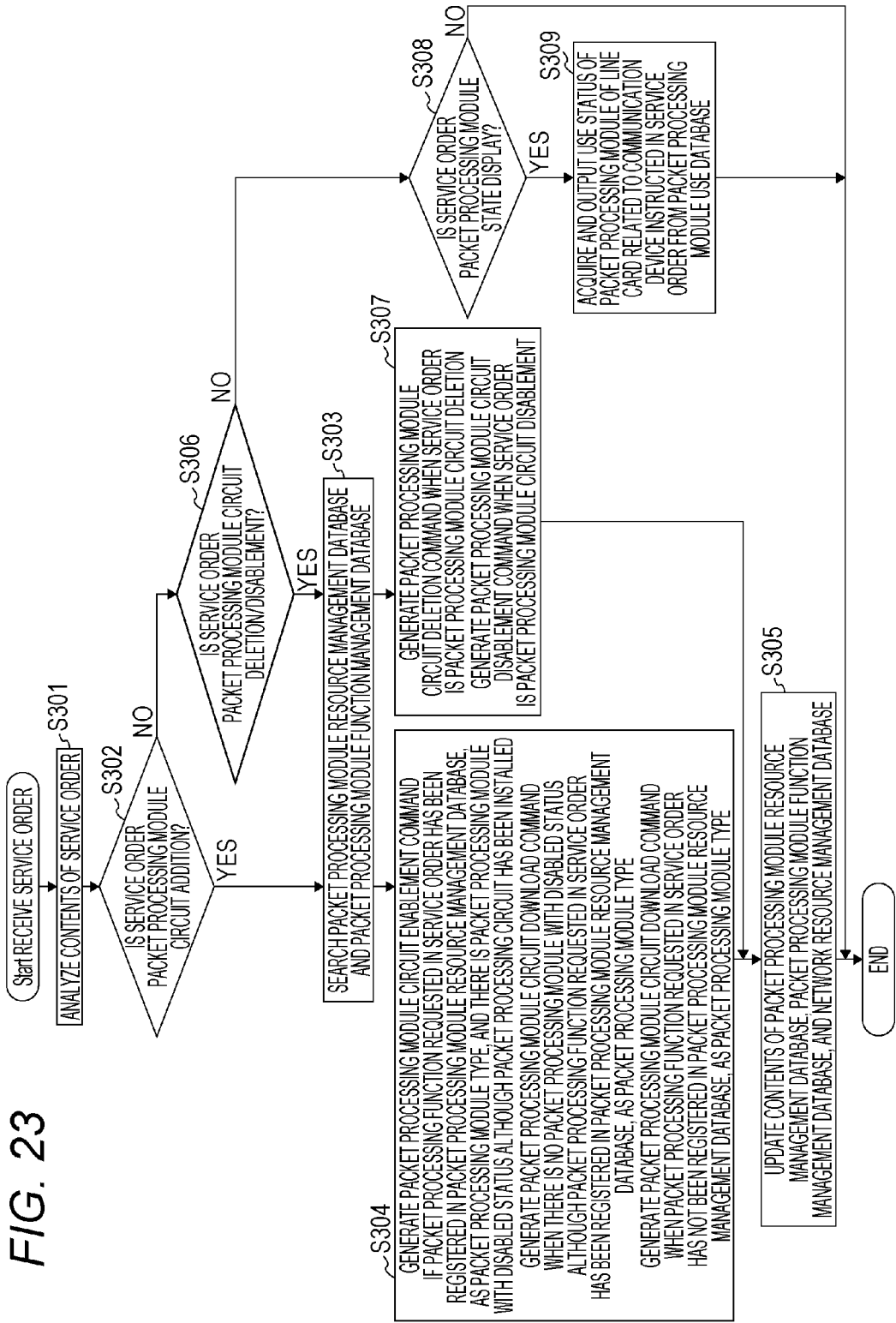
FIG. 23 is a processing flow of when the network management system has received a command from a human machine interface.

A processing flow of the packet processing module calculation unit 51 and the packet processing module circuit download unit 52 of when the NMS 20 has received the service order from the human machine interface 21 will be described with reference to FIG. 23.

When having received the service order from the human machine interface 21, the packet processing module calculation unit 51 analyzes contents of the service order (S301). Types of the service order mainly include "addition of a packet processing module circuit", "deletion/disablement of a packet processing module circuit", and "state display of a packet processing module circuit".

The packet processing module calculation unit 51 determines whether the service order is the "addition of a packet processing module circuit" (S302). When having determined that the service order is the "addition of a packet processing module circuit", the packet processing module calculation unit 51 searches the packet processing module resource management database 61 and the packet processing module function management database 62. The communication device ID and the line card ID instructed in the service order and the like are used as the search keys of the databases. First, the packet processing module calculation unit 51 acquires the reserved packet processing module number 106 and the busy packet processing module number 107 from the packet processing module resource management database 61, and confirms existence or non-existence of the packet processing module to which the packet processing module circuit is installed but the packet processing module circuit is disabled. Next, the packet processing module calculation unit 51 confirms which packet processing module circuit is installed to which packet processing module, from the packet processing module function management database 62 (S303).

Next, if the packet processing function requested in the service order has already been registered in the packet processing module resource management database 61, as the packet processing module type 105, and there is a packet processing module with the status 115 of "disablement", of the packet processing module function management database 62, although the packet processing module circuit having the packet processing function requested in the service order has already been installed to the packet processing module on the line card of the communication device 30-*n* corresponding to the communication device ID and the line card ID instructed in the service order, the packet processing module circuit download unit 52 identifies the packet processing module ID of the packet processing module, and generates the packet processing module circuit enablement/disablement command 304 in order to enable the packet processing module circuit of the packet processing module. The packet processing module circuit download unit 52 stores the communication device ID and the line card ID instructed in the service order to the device ID 304-1 and the line card ID 304-2 of the packet processing module circuit enablement/disablement command 304, stores the packet processing module group ID corresponding to the packet processing function instructed in the service order to the packet processing module group ID 304-3, stores the "packet processing module circuit enablement" to the packet processing function command type, and stores the identified packet processing module ID to the target packet processing module ID (S304).

Further, when there is no packet processing module with the status 115 of "disablement", of the packet processing module function management database 62, although the packet processing function requested in the service order has already been registered in the packet processing module resource management database 61, as the packet processing module type, the packet processing module circuit download unit 52 identifies the packet processing module ID of the packet processing module with the packet processing module type 114 of "empty", and generates the packet processing module circuit download command 303 in order to install the packet processing module circuit to the identified packet processing module. The packet processing module circuit download unit 52 stores the communication device ID and the line card ID instructed in the service order, to the device ID 303-1 and the line card ID 303-2 of the packet processing module circuit download command 303, stores the packet processing module group ID corresponding to the packet processing function instructed in the service order to the packet processing module group ID 303-3, stores the identified packet processing module ID to the target packet processing module ID 303-5, stores the type of the packet processing module corresponding to the packet processing function instructed in the service order to the packet processing module type 303-6, and stores the program information of the packet processing module circuit acquired from the packet processing module circuit database 68 to the packet processing module circuit file 303-7 (S304).

Further, when the packet processing function requested in the service order is not registered in the packet processing module resource management database 61, as the packet processing module type 105, the packet processing module circuit download unit 52 identifies the packet processing module ID of the packet processing module with the packet processing module type 114 of "empty", and generates the packet processing module circuit download command 303 in order to install the packet processing module circuit to the identified packet processing module (S304). The packet processing module circuit download unit 52 stores the communication device ID and the line card ID instructed in the service order to the device ID 303-1 and the line card ID 303-2 of the packet processing module circuit download command 303, stores the packet processing module group ID corresponding to the packet processing function instructed in the service order to the packet processing module group ID 303-3, stores the identified packet processing module ID to the target packet processing module ID 303-5, stores the type of the packet processing module corresponding to the packet processing function instructed in the service order to the packet processing module type 303-6, and stores the program information of the packet processing module circuit acquired from the packet processing module circuit database 68 to the packet processing module circuit file 303-7 (S304).

Next, the packet processing module circuit download unit 52 updates the contents of the packet processing module resource management database 61 and the packet processing module function management database 62 (S305).

With the above processing, the packet processing module circuit can be added to the communication device 30-*n* according to an instruction from the network operator.

Next, a case where the service order is the "packet processing module circuit deletion/disablement" will be described. When having determined at S302 that the service order is not the "addition of the packet processing module circuit", the packet processing module calculation unit 51 determines whether the service order is the "packet processing module circuit deletion/disablement" (S306).

When the having determined that the service order is the "packet processing module circuit deletion/disablement", the packet processing module calculation unit 51 searches the packet processing module resource management database 61 and the packet processing module function management database 62. The communication device ID, the line card ID, and the like instructed in the service order are used as the search keys of the packet processing module resource management database 61 and the packet processing module function management database 62. First, the packet processing module calculation unit 51 acquires the reserved packet processing module number 106 and the busy packet processing module number 107 from the packet processing module resource management database, and confirms existence or non-existence of the packet processing module in which the packet processing module circuit is installed, but the packet processing module circuit is disabled. Next, the packet processing module calculation unit 51 identifies which packet processing module circuit is installed to which packet processing module, from the packet processing module function management database 62 (S303).

Next, when the service order is the "packet processing module circuit deletion", the packet processing module circuit download unit 52 identifies the packet processing module ID of the packet processing module 74-*n* to which the packet processing module circuit corresponding to the packet processing function instructed in the service order is installed, from the packet processing module function management database 62, and generates the packet processing module circuit deletion command 305. The packet processing module circuit download unit 52 stores the communication device ID and the line card ID instructed in the service order to the device ID 305-1 and the line card ID 305-2 of the packet processing module circuit deletion command 305, stores the packet processing module group ID corresponding to the packet processing function instructed in the service order to the packet processing module group ID 305-3, and stores the identified packet processing module ID to the target packet processing module ID 303-5.

When the service order is the "packet processing module circuit disablement", the packet processing module circuit download unit 52 identifies the packet processing module ID of the packet processing module with the status 115 of enablement, of the packet processing modules 74 to which the packet processing module circuit corresponding to the instructed packet processing is installed, from the packet processing module function management database 62, and generates the packet processing module circuit enablement/disablement command 304 (S307). The packet processing module circuit download unit 52 stores the communication device ID and the line card ID instructed in the service order to the device ID 304-1 and the line card ID 304-2 of the packet processing module circuit enablement/disablement command 304, stores the packet processing module group ID corresponding to the packet processing function instructed in the service order to the packet processing module group ID 304-3, stores the "packet processing module circuit disablement" to the command type 304-4, and stores the identified packet processing module ID to the target packet processing module ID 304-5.

Next, the packet processing module circuit download unit 52 updates the contents of the packet processing module resource management database 61 and the packet processing module function management database 62 (S305).

With the processing, the network system of the present invention can delete or disable the packet processing module circuit according to an instruction from the operator.

Next, a case where the service order is the "packet module state display request" will be described. When having determined at S306 that the service order is the "packet processing module circuit deletion/disablement", the packet processing module calculation unit 51 determines whether the service order is the "packet module state display request" (S308). When having determined that the service order is the "packet module state display request", the packet processing module calculation unit 51 searches the packet processing module resource management database 61 and the packet processing module function management database 62. The communication device ID, the line card ID, and the like instructed in the service order are used as the search keys of the packet processing module resource management database 61 and the packet processing module function management database 62. The packet processing module calculation unit 51 acquires the use statuses of all of the packet processing modules belonging to the communication device 30-*n* instructed in the service order from the packet processing module resource management database 61 and the packet processing module function management database 62. The packet processing module calculation unit 51 outputs information related to the acquired use statuses of the packet processing modules in order to display the acquired use statuses of the packet processing module on the screen of the human machine interface 21 (S309).

With the processing, the operator can grasp the use status of the communication device 30-*n*, and can create a plan of an increase in facility and the like.

The network system of the present invention having the above-described characteristics increases/decreases only packet processing module circuits necessary for processing the amount of data packets received in the communication device 30-*n* to/from the communication device, thereby to build the communication device 30-*n* with necessary and sufficient packet processing module circuits for processing the data amount flowing into the network. Accordingly, when the communication operator introduces a new communication service, a network system that can build the network with a necessary minimum investment cost can be provided.

Further, the network system of the present invention changes the packet processing module circuit operated on the packet processing module, thereby to accommodate the new communication service to the network without changing hardware of the communication device being in use.

Further, the network system of the present invention manages the type of the communication protocol that can be processed with the packet processing module circuit installed in the communication device and the number of the installed packet processing module circuits, and monitors the amount of the data packets flowing into the communication device and reception of the data packet of a new communication protocol. When the communication device 30-*n* gets into a situation where the received data packet cannot be processed with the currently installed packet processing module circuit, the communication device 30-*n* reports the status to the NMS 20, whereby the NMS 20 can provide the network system that enables the communication device to add the packet processing module circuit, voluntarily or by gaining approval with the network operator.

[Screen Display Example of Human Machine Interface]

Figure 24:
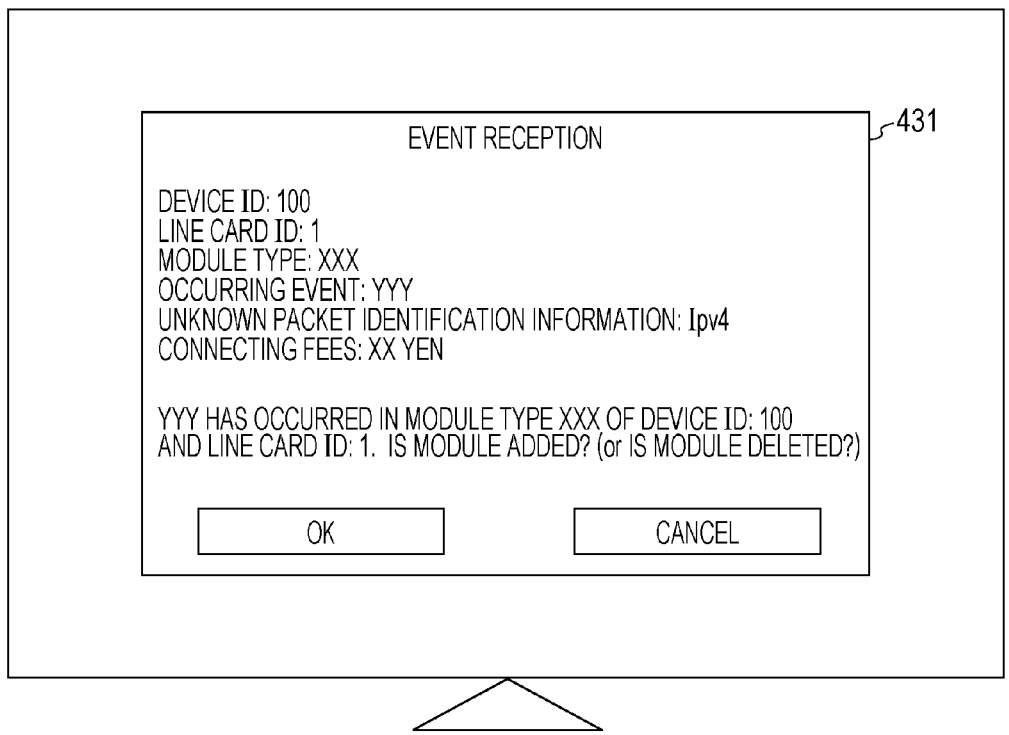
FIG. 24 is an example of a packet processing module circuit addition recommendation screen from the network management system.

FIG. 24 is an example of a screen displayed in the human machine interface 21 when the event notification command 301 is received from the communication device 30-*n*. The human machine interface 21 opens an event reception notification window 431. The human machine interface 21 displays, on the event reception notification window 431, the information such as the device ID, the line card ID, and the packet processing module type (XXX on the screen), for identifying the transmission source of the event, based on the information received from the NMS 20. Further, the human machine interface 21 displays information of the occurring event (YYY on the screen), and the unknown protocol packet identification information. Note that the unknown protocol packet identification information is displayed only when an unknown packet reception event is received. The packet module type is not displayed at this time.

Further, the human machine interface 21 displays, on the screen, information that prompts an operation such as "YYY has occurred in the packet processing module type XXX of the "device ID: 100 and the line card ID: 1. Is the packet processing module circuit is added?" or "YYY has occurred in the packet processing module type XXX of the device ID: 100 and the line card ID: 1. Is the packet processing module circuit is deleted?". When prompting addition or deletion of the packet processing module circuit, the human machine interface 21 may display information that indicates a necessary charge to add the packet processing module circuit or a charge that becomes unnecessary if the packet processing module circuit is deleted. For example, as illustrated, the human machine interface 21 may display "connecting fees: XX yen", "connecting fees: XX yen/month", or the like. The information indicating a charge that becomes unnecessary if the packet processing module circuit is deleted is an amount of money reduced (returned) by the deletion of the packet processing module circuit in a case where a contract period is several years.

FIG. 25 is a diagram illustrating an example of an operator notification screen of when contents of a network change instruction command received by the NMS 20 from another control system is a communication service addition request. When the NMS 20 has received the network change instruction command such as the communication service addition request or a communication service deletion request from another control system, the communication service addition request window 441 from the another system is displayed on the screen of the human machine interface 21. Information such as a control system name that has transmitted the network change instruction command, and the communication device 30-*n* that needs setting for receiving the communication service addition request from the control system is displayed on the communication service addition request window 441.

For example, when it is determined that addition of a new packet processing module circuit is necessary to the line card ID 1 of the device ID 100 as a result of an analysis of the network change instruction command from the another control system by the NMS 20 at S602, the device ID: 100, the line card ID: 1, the packet processing module type: IPv4 (display contents are changed according to a protocol to be accommodated), the priority of providing the service, and a requested bandwidth are displayed on the screen of the human machine interface 21. Further, information that prompts an operation such as "the IPv4 module is necessary for the device ID: 100 and the line card ID: 1. Please purchase the IPv4 function module." is displayed on the communication service addition request window 441. When addition of the packet processing module circuit is prompted, information that indicates a necessary charge to add the packet processing module circuit may be displayed. For example, as illustrated, "connecting fees: XX yen", "connecting fees: XX yen/month" or the like may be displayed.

Figure 26:
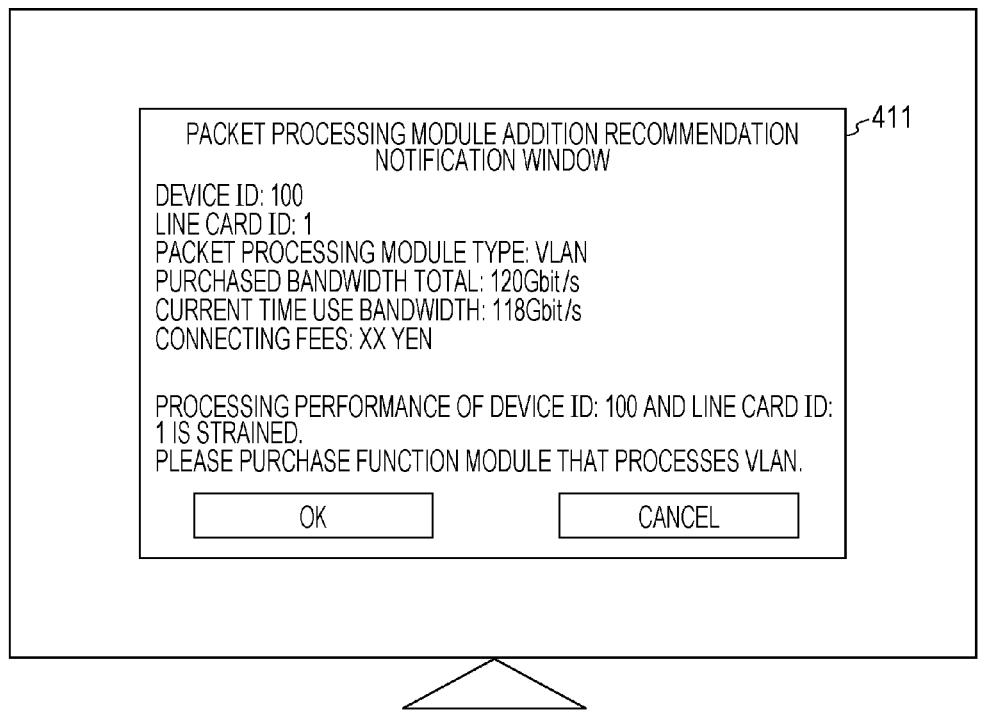
FIG. 26 is an example of a packet processing module circuit addition recommendation notification screen from the network management system.

FIG. 26 is an example of the packet processing module circuit addition recommendation notification window 411. The device ID, the line card ID, the packet module type, a purchased bandwidth total (that is, the total bandwidth 144), and the current time use bandwidth 145, for identifying the transmission source of the event, are displayed on the packet processing module circuit addition recommendation notification window 411. Further, information that prompts an operation such as "the processing performance of the device ID: 100 and the line card ID: 1 is strained. Please purchase the function module that processes VLAN" is displayed on the packet processing module circuit addition recommendation notification window 411. When addition of the packet processing module circuit is prompted, the information that indicates a necessary charge to add the packet processing module circuit may be displayed. For example, as illustrated, "connecting fees: XX yen", "connecting fees: XX yen/month", or the like may be displayed.

Figure 27:
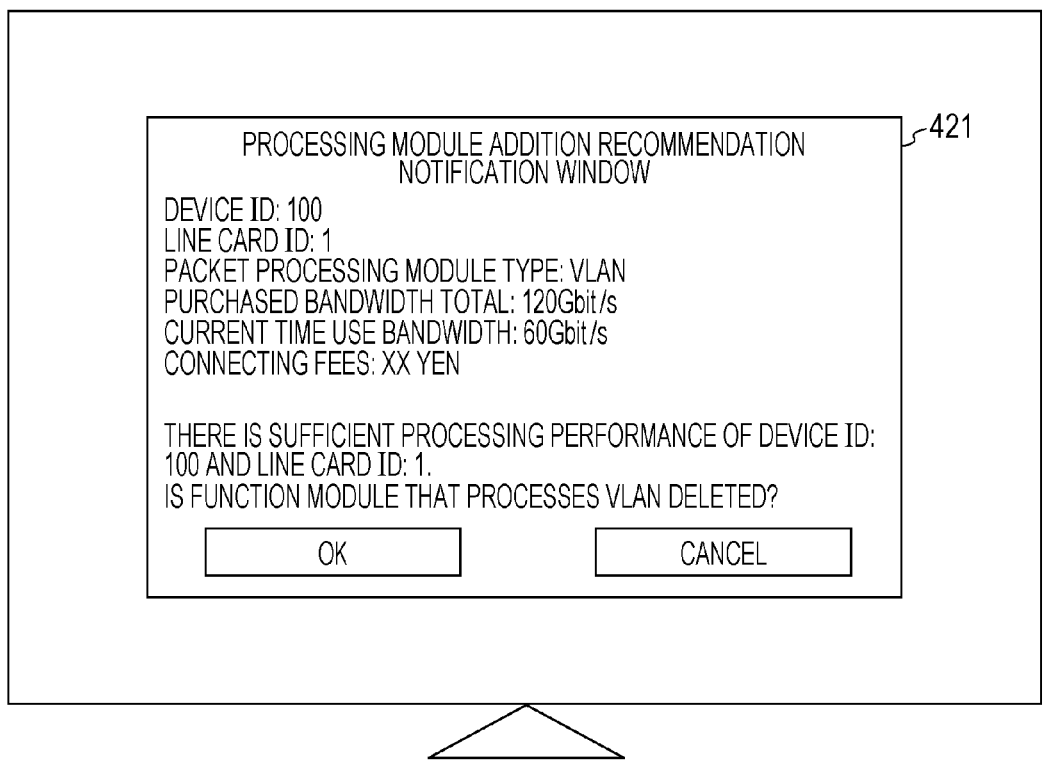
FIG. 27 is an example of a packet processing module circuit reduction recommendation notification screen from the network management system.

FIG. 27 illustrates an example of the packet processing module circuit deletion recommendation notification window 421. The device ID, the line card ID, the packet processing module type, the purchased bandwidth total (that is, the total bandwidth 144), and the current time use bandwidth 145, for identifying the transmission source of the event, are displayed on the packet processing module circuit deletion recommendation notification window 421. Further, information that prompts an operation such as "there is sufficient processing performance of the device ID: 100 and the line card ID: 1. Is the function module circuit that processes VLAN deleted?" is displayed on the packet processing module circuit deletion recommendation notification window 421. When deletion of the packet processing module circuit is prompted, the information indicating a charge that becomes unnecessary when the packet processing module circuit is deleted may be displayed. For example, as illustrated, "connecting fees: XX yen", "connecting fees: XX yen/month", or the like may be displayed.

Figure 28:
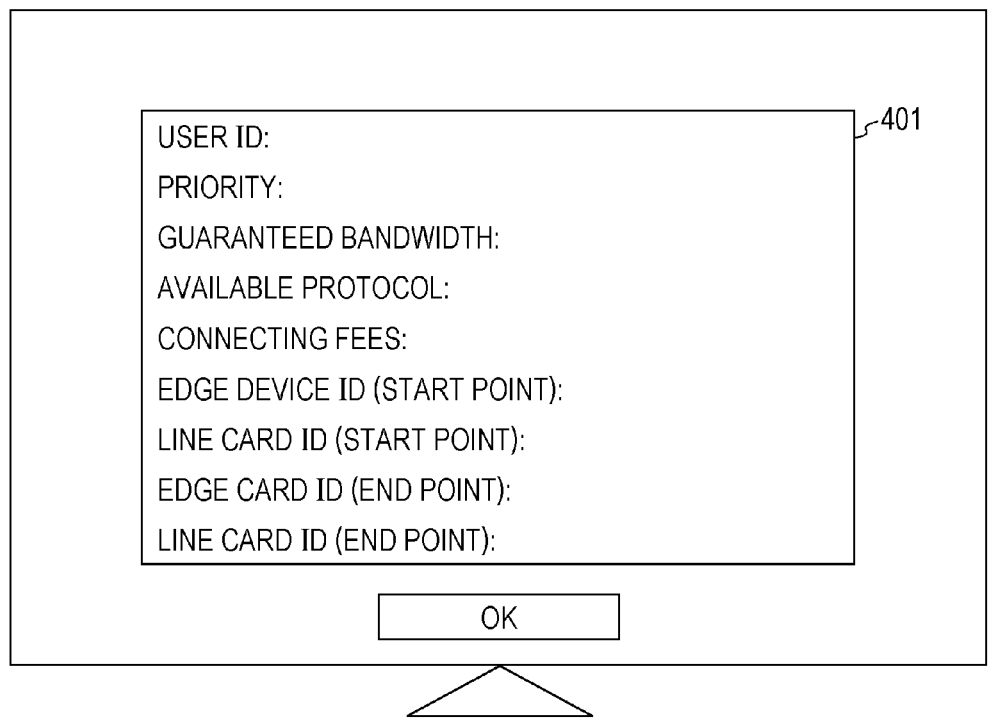
FIG. 28 is an example of an operation screen on which a new user is added.

FIG. 28 is a diagram illustrating an example of a screen of the human machine interface 21 of when the network use user is registered to the network system of the present invention.

Setting items are displayed on a network use user registration window 401. The setting items include a "user ID" that uniquely identifies the network use user in the network system, a "priority" that sets the priority of the user, a "guaranteed bandwidth" that sets a guaranteed bandwidth of the user, an "available protocol" that sets a communication protocol used by the user, "connecting fees" that set a network use charge to be paid by the user, an "edge device ID (start point)" that specifies an edge device that accommodates the network use user and a line card thereof, a "line card ID (start point)", an "edge device ID (end point)", and a "line card ID (end point)".

When the network operator presses an OK button after performing the setting, the human machine interface 21 notifies these setting values to the NMS 20. The network path calculation unit 53 of the NMS 20 refers to the "edge device ID (start point)", the "line card ID (start point)", the "edge device ID (end point)", the "line card ID (end point)", the "priority", and the "guaranteed bandwidth", which have been set in the human machine interface 21, the network topology database 63, the network resource management database 64, and the packet processing module status database 66, calculates a communication route of the user in the WAN 40, and determines a path route of the user in the WAN 40. The NMS 20 adds an entry to the user management database 65, and stores the determined path route in the route information 135 together with the information such as the user ID and the priority. Further, the NMS 20 notifies the calculated path route to the communication device 30-n. Accordingly, the communication route is set on the WAN 40.

Further, when the user ID is input, the human machine interface 21 can read the already-registered network use user information from the user management database 65, and can re-edit the read network use user information. When the network use user information is re-edited, the user management database 65 of the NMS 20 is overwritten. To be specific, When the NMS 20 has received the user ID from the human machine interface 21, the packet processing module calculation unit 51 searches the user management database 65 using the received user ID as the search key, and transmits found user information to the human machine interface 21. Further, when the human machine interface 21 has changed the user ID using the window illustrated in FIG. 28, the NMS 20 receives the user information after change, and the packet processing module calculation unit 51 updates the information of the user management database 65.

When the user management database 65 is updated, the network path calculation unit 53 re-calculates the communication route of the user. When the communication route on the WAN 40 is changed as a result of the recalculation, the NMS 20 notifies deletion of the old path route and setting of the new path route to the communication device 30-n. Accordingly, the communication route is set on the WAN 40.

Further, when the NMS 20 adds a new network use user or a guaranteed bandwidth of an existing network use user, upon an instruction from the human machine interface 21, and when a total sum of integrated values of the guaranteed bandwidths of the network use users who use the communication device 30-n exceeds the packet processing performance of the communication device 30-n, the NMS 20 displays the information that prompts addition of the packet processing module circuit, in the human machine interface 21. Note that the packet processing performance can be calculated by the busy packet processing module number 107×the processing performance of the packet processing module (a performance value unique to the packet processing module).

Accordingly, the operator who uses the network system of the present invention can arrange necessary and sufficient function processing modules according to the total sum of the guaranteed bandwidths of the network use users to be accommodated.

Further, as a condition to display the information that prompts addition of the packet processing module circuit on the screen of the human machine interface 21, a case where the total sum of the guaranteed bandwidths of the users having a priority higher than a certain priority becomes larger than the packet processing performance of the communication device 30-n may be employed. Accordingly, the necessary and sufficient packet processing module circuits can be arranged to the users with a high priority, from which earnings growth can be expected.

What is claimed is:

1. A network system comprising:
a plurality of communication devices; and
a management server, including a processor coupled to a memory, configured to manage the plurality of communication devices,
wherein each of the communication devices include a plurality of packet processing modules that receive and process data packets, in which a packet processing function is changeable with a program,
wherein the memory of the management server: stores instructions that when executed by the processor, cause the processor to:
hold program information of a plurality of different packet processing module circuits settable to the packet processing modules that receive and process data packets,
select a packet processing module circuit to be set to the packet processing module, of the plurality of different packet processing module circuits, and
transmit the program information of the selected packet processing module circuit and information for identifying the packet processing module that is an object to be set, to the communication device that is an object to be set, and
wherein the processing of the data packet by the packet processing module is based on the transmitted program information,
wherein the management server:
generates a command that includes contents to change a setting of a packet processing module, the command is one of a download command, enablement command, deletion command, and a disablement command, based on a use status of the packet processing modules of the communication device received from the communication device, or a service order received from a human machine interface, and transmits the generated command to the communication device including the packet processing module, setting of which is to be changed, and wherein the management server includes:

a packet processing module resource management database that manages packet processing modules to which a same packet processing module circuit is installed, of the plurality of packet processing modules on a same line card, as a packet processing module group, upon determining to add a predetermined packet processing module circuit, based on the use status of the packet processing modules of the communication device received from the communication device, and upon determining there is a disabled packet processing module circuit in the packet processing module group to which a packet processing module circuit of a type to be added is installed, the management server transmits a command that instructs the communication device to enable the disabled packet processing module, and upon determining there is not a disabled packet processing module circuit in the packet processing module group to which the packet processing module circuit of a type to be added is installed, and there is a packet processing module to which a packet processing module circuit is not installed, in the packet processing modules on the same line card, the management server transmits the program information of the packet processing module circuit of a type to be added, to the communication device.

2. The network system according to claim 1, wherein the management server:

generates information for displaying a screen for recommending addition or deletion of the packet processing module circuit, in a human machine interface, based on a current use bandwidth of each of the communication devices received from each of the communication devices, and a predetermined threshold, and outputs the generated information to the human machine interface.

3. The network system according to claim 2, wherein the information for displaying a screen for recommending addition or deletion of the packet processing module circuit, in the human machine interface, includes charge information to be paid or change information that is reduced or becomes unnecessary, when the packet processing module circuit is added or deleted, and the management server outputs the charge information.

4. The network system according to claim 1, wherein the communication device transmits event occurrence notification to the management server, at a time of detection of packet discard of each priority, at a time of occurrence of a load of a predetermined threshold or more, or of a predetermined threshold or less, of a queue of each priority, or at a time of detection of an unsupported protocol, and the management server generates information for displaying a screen for recommending addition or deletion of the packet processing module circuit, in a human machine interface, or generates a command including setting change contents of the packet processing module circuit on the packet processing module, based on contents of the notified event occurrence notification.

5. A management server, including a memory and a processor, configured to be connected with a plurality of communication devices including a plurality of packet processing modules that receive and process data packets in which a packet processing function is changeable with a program, the management server configured to:

hold program information of a plurality of different packet processing module circuits settable to the packet processing modules that receive and process data packets;

select a packet processing module circuit to be set to the packet processing module, of the plurality of different packet processing module circuits;

transmit program information of the selected packet processing module circuit and information for identifying the packet processing module that is an object to be set, to the communication device that is an object to be set; and generate a command that includes contents to change a setting of a packet processing module, the command is one of a download command, enablement command, deletion command, and a disablement command, based on a use status of the packet processing modules of the communication device received from the communication device, or a service order received from a human machine interface; and transmit the generated command to the communication device including the packet processing module, setting of which is to be changed, wherein the processing of the data packet received by the packet processing module is based on the transmitted program information, and wherein the management server comprises:

a packet processing module resource management database that manages packet processing modules to which a same packet processing module circuit is installed, of the plurality of packet processing modules on a same line card, as a packet processing module group, and when having determined to add a predetermined packet processing module circuit, based on the use status of the packet processing modules of the communication device received from the communication device, and when there is a disabled packet processing module circuit in the packet processing module group to which a packet processing module circuit of a type to be added is installed, the management server transmits a command that instructs the communication device to enable the disabled packet processing module, and when there is not a disabled packet processing module circuit in the packet processing module group to which the packet processing module circuit of a type to be added is installed, and there is a packet processing module to which a packet processing module circuit is not installed, in the packet processing modules on the same line card, the management server transmits the program information of the packet processing module circuit of a type to be added, to the communication device.

6. The management server according to claim 5, the management server further configured to:

be connected to a human machine interface;

generate information for displaying a screen for recommending addition or deletion of the packet processing module circuit, in the human machine interface, based on a current use bandwidth of each of the communication devices received from each of the communication devices, and a predetermined threshold; and output the generated information to the human machine interface.

7. The management server according to claim 6, wherein the information for displaying a screen for recommending addition or deletion of the packet processing module circuit, in the human machine interface, includes charge information to be paid or change information that is reduced or becomes unnecessary, when the packet processing module circuit is added or deleted, and the management server outputs the charge information.

* * * * *